(12) United States Patent
Fung et al.

(10) Patent No.: US 10,077,055 B2
(45) Date of Patent: *Sep. 18, 2018

(54) SYSTEM AND METHOD FOR DETERMINING THE INFORMATION TRANSFER RATE BETWEEN A DRIVER AND VEHICLE

(71) Applicant: Honda Motor Co., Ltd., Tokyo (JP)

(72) Inventors: Kin C. Fung, Dublin, OH (US);
Timothy J. Dick, Dublin, OH (US);
Charles William Hall, Jr., Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 15/389,907

(22) Filed: Dec. 23, 2016

(65) Prior Publication Data

US 2017/0106873 A1 Apr. 20, 2017

Related U.S. Application Data

(63) Continuation-in-part of application No. 15/145,360, filed on May 3, 2016, now Pat. No. 9,809,057, which
(Continued)

(51) Int. Cl.
*G05D 1/00* (2006.01)
*B60W 40/08* (2012.01)
(Continued)

(52) U.S. Cl.
CPC ............. *B60W 40/08* (2013.01); *B60Q 9/00* (2013.01); *B60W 50/04* (2013.01); *G01S 19/13* (2013.01);
(Continued)

(58) Field of Classification Search
CPC ................ B60W 40/08; B60W 2040/0818
(Continued)

(56) References Cited

U.S. PATENT DOCUMENTS

| 5,191,524 A | 3/1993 | Pincus et al. |
| 6,061,610 A | 5/2000 | Boer |

(Continued)

FOREIGN PATENT DOCUMENTS

| RU | 2298215 | 4/2007 |
| WO | 2013113947 | 8/2013 |

OTHER PUBLICATIONS

International Search Report and Written Opinion of PCT/US2015/037019 dated Nov. 2, 2015, 12 pages.
(Continued)

*Primary Examiner* — Gertrude Arthur Jeanglaude
(74) *Attorney, Agent, or Firm* — Rankin, Hill & Clark LLP

(57) ABSTRACT

A method and a system for determining an information transfer rate between a driver and a vehicle, including measuring driver information and measuring vehicle information. Further, calculating a forward information transfer rate from the driver to the vehicle using the driver information and the vehicle information over a period of time, and calculating a reverse information transfer rate from the vehicle to the driver using the driver information and the vehicle information over the period of time. Additionally the method includes, calculating a driver control state using the forward information transfer rate and the reverse information transfer rate.

20 Claims, 13 Drawing Sheets

Related U.S. Application Data is a continuation of application No. 14/573,778, filed on Dec. 17, 2014, now Pat. No. 9,352,751.

(60) Provisional application No. 62/016,020, filed on Jun. 23, 2014.

(51) Int. Cl.
  *B60W 50/04* (2006.01)
  *B60Q 9/00* (2006.01)
  *G01S 19/13* (2010.01)
  *G01S 19/14* (2010.01)
  *G01S 19/42* (2010.01)

(52) U.S. Cl.
  CPC .............. *G01S 19/14* (2013.01); *G01S 19/42* (2013.01); *B60W 2040/0818* (2013.01); *B60W 2540/00* (2013.01); *H05K 999/99* (2013.01)

(58) Field of Classification Search
  USPC .............................................. 701/1, 36, 424
  See application file for complete search history.

(56) References Cited

U.S. PATENT DOCUMENTS

| | | | |
|---|---|---|---|
| 6,876,949 B2 | 4/2005 | Hilliard et al. | |
| 7,149,653 B2 | 12/2006 | Bihler et al. | |
| 7,839,292 B2 | 11/2010 | Wang et al. | |
| 8,315,757 B2 | 11/2012 | Yamamura et al. | |
| 9,809,057 B2 * | 11/2017 | Fung .......................... | B60C 9/00 |
| 2004/0088095 A1 | 5/2004 | Eberle et al. | |
| 2005/0155808 A1 | 7/2005 | Braeuchle et al. | |
| 2007/0159344 A1 | 7/2007 | Kisacanin | |
| 2009/0284361 A1 | 11/2009 | Boddie et al. | |
| 2012/0123806 A1 | 5/2012 | Schuman | |
| 2012/0290215 A1 | 11/2012 | Alder et al. | |
| 2013/0158741 A1 | 6/2013 | Hahne | |
| 2013/0245886 A1 | 9/2013 | Fung et al. | |
| 2014/0121927 A1 | 5/2014 | Hanita | |
| 2014/0309789 A1 | 10/2014 | Ricci | |
| 2014/0309893 A1 | 10/2014 | Ricci | |

OTHER PUBLICATIONS

Office Action of U.S. Appl. No. 14/851,753 dated Sep. 27, 2016, 95 pages.
Office Action of U.S. Appl. No. 14/851,753 dated Dec. 21, 2016, 12 pages.
Office Action of U.S. Appl. No. 15/145,360 dated Jun. 14, 2017, 23 pages.
Office Action of U.S. Appl. No. 14/851,753 dated Mar. 22, 2017, 14 pages.

* cited by examiner

SYSTEM AND METHOD FOR DETERMINING THE INFORMATION TRANSFER RATE BETWEEN A DRIVER AND VEHICLE

RELATED APPLICATIONS

This application is a continuation-in-part of U.S. application Ser. No. 15/145,360, filed on May 3, 2016, now published as U.S. Pub. No. 2016/0243985, which is expressly incorporated herein by reference. U.S. application Ser. No. 15/145,360 is a continuation of U.S. application Ser. No. 14/573,778, filed on Dec. 17, 2014, now patented as U.S. Pat. No. 9,352,751, which is also expressly incorporated herein by reference. U.S. application Ser. No. 14/573,778 claims priority to U.S. Prov. App. Ser. No. 62/016,020, filed on Jun. 23, 2014, which is also expressly incorporated herein by reference.

BACKGROUND

During driving, information flows from a driver to a vehicle and from the vehicle to the driver. To maintain control of the vehicle, a constant flow of information is required from the driver to the vehicle and from the vehicle to the driver. The driver maintains control of the vehicle, for example, by transmitting information to the vehicle through the steering wheel, accelerator and brakes to produce appropriate changes in vehicle acceleration, velocity, lane position, and direction. Additionally, the driver maintains control of the vehicle, for example, by transmitting this information in response to information transmitted to the driver from the vehicle. A change (e.g., increase or decrease) in the flow of information from the driver to the vehicle and/or the vehicle to the driver, such as due to driver impairment (e.g., distracted, drowsy, stressed, intoxicated), can result in a reduction or loss of vehicular control.

BRIEF DESCRIPTION

According to one aspect, a computer-implemented method for determining an information transfer rate, includes measuring driver information from a driver, measuring vehicle information from a vehicle. Further, the method includes calculating a forward information transfer rate from the driver to the vehicle using the driver information and the vehicle information over a period of time, and calculating a reverse information transfer rate from the vehicle to the driver using the driver information and the vehicle information over the period of time. The method includes calculating a driver control state using the forward information transfer rate and the reverse information transfer rate.

According to another aspect, a non-transitory computer readable medium comprising instructions that when executed by a processor perform a method for determining an information transfer rate. The method includes measuring driver information from a driver and measuring vehicle information from a vehicle. The method includes calculating a forward information transfer rate from the driver to the vehicle using the driver information and the vehicle information over a period of time, and calculating a reverse information transfer rate from the vehicle to the driver using the driver information and the vehicle information over the period of time. Further, the method includes calculating a driver control state using the forward information transfer rate and the reverse information transfer rate.

According to yet another aspect, an information transfer rate system for determining an information transfer rate includes a computer processor, and a computer readable storage medium storing executable code when executed by the computer processor performs a method. The method includes measuring driver information from a driver information sensing device and measuring vehicle information from a vehicle information sensing device. The method includes calculating a forward information transfer rate from the driver to the vehicle using the driver information and the vehicle information over a period of time, and calculating a reverse information transfer rate from the vehicle to the driver using the driver information and the vehicle information over the period of time. Further, the method includes, calculating a driver control state using the forward information transfer rate and the reverse information transfer rate, controlling a vehicle system based on the driver control state.

DETAILED DESCRIPTION

Figure 1:
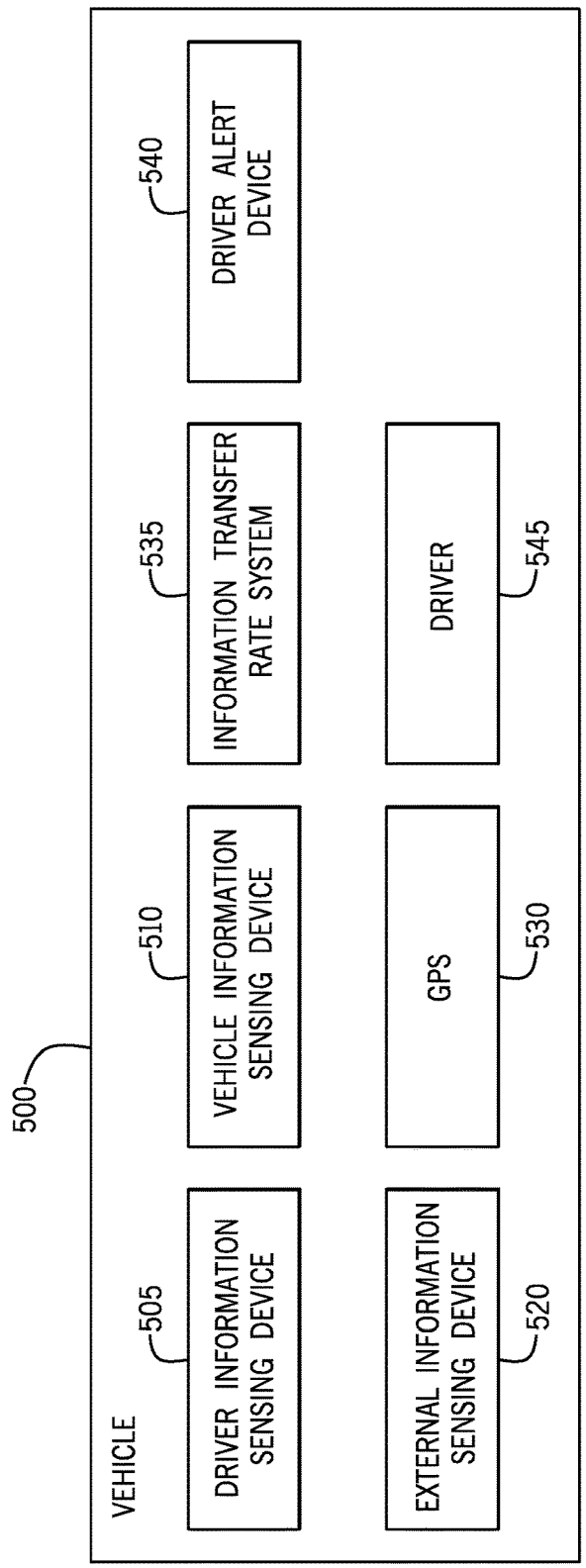
FIG. 1 is a schematic view of a vehicle having an information transfer rate system for determining the information transfer rate between a driver and vehicle according to an exemplary embodiment.

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a programmed analog device, a memory device containing executing instructions, and so on.

A "database", as used herein can refer to table, a set of tables, a set of data stores and/or methods for accessing and/or manipulating those data stores.

An "output device" as used herein can include devices that can derive from vehicle components, systems, subsystems, and electronic devices. The term "output devices" includes, but is not limited to: display devices, and other devices for outputting information and functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of blocks (instructions) leading to a desired result. The blocks are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of blocks requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic)

quantities within the computer system memories or registers or other such information storage, transmission or display devices.

Certain aspects of the embodiments described herein include process blocks and instructions described herein in the form of an algorithm. It should be noted that the process blocks and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method blocks. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

I. System Overview

Referring now to the drawings, wherein the showings are for purposes of illustrating one or more exemplary embodiments and not for purposes of limiting same, in FIG. 1, there is shown a schematic view of a vehicle 500 having an information transfer rate system 535 for determining the information transfer rate between a driver 545 and vehicle 500 according to an exemplary embodiment. In one embodiment, the vehicle 500 comprises a driver information sensing device 505, a vehicle information sensing device 510, an information transfer rate system 535, a driver alert device 540, a GPS 530, and optionally an external information sensing device 520. Note that the vehicle 500 can include components other than those illustrated in FIG. 1 and further note that some components of a vehicle 500 such as the engine, tires, and suspension are omitted for brevity purposes.

Controlling a vehicle 500 requires a constant flow of information from the driver 545 to the vehicle 500 in accordance with road and traffic conditions. To control the vehicle 500, the driver 545 must transmit information by way of one or more driver control input devices to produce appropriate changes in vehicle acceleration, velocity, lane position, and direction. Driver control input devices (not shown) include, but are not limited to, a steering wheel, accelerator pedal, and brake pedal. Thus, a reduction in information transfer from the driver 545 to the vehicle 500 can signal a reduction in vehicular control, as could be the case with a driver 545 who is distracted, drowsy, intoxicated or experiencing a medical emergency.

In one embodiment, the driver information sensing device 505 can measure driver information directly from the driver 545, such as biometric data and direct driver control input device data. Driver biometric data can include one or more types of driver biometric data, including, but not limited to, eyelid aperture, pupil diameter, head position, gaze direction, eye blink rate, respiratory rate, heart rate, hand position, aortic blood flow, leg position, and brain electrical activity. Direct driver control input device data can include data from one or more types of driver control input devices, such as, but not limited to, the steering wheel, brake pedal, and gas pedal of vehicle 500. Accordingly, the direct driver control input device data, can include, but is not limited to, one or more of the position of the vehicle steering wheel, turn velocity of the steering wheel, turn acceleration of the steering wheel, position of the vehicle gas pedal, velocity of the gas pedal, acceleration of the gas pedal, position of the vehicle brake pedal, velocity of the brake pedal, and acceleration of the brake pedal.

It is contemplated that in some embodiments, one driver information sensing device 505 can be used to measure one or more types of driver information directly from the driver 545. In other embodiments, multiple driver information sensing devices 505 can be used to measure multiple types of driver information directly from the driver 545. For example, in one embodiment, driver information sensing device 505 can include an electroencephalograph for measuring the driver brain electrical activity. In another embodiment, one driver information sensing device 505 can include a camera for measuring the driver eyelid aperture, the gas pedal for measuring the position of the vehicle gas pedal, and the brake pedal for measuring the position of the vehicle brake pedal, and so forth.

Further, in other embodiments, the driver information sensing device 505 can be a camera for measuring the driver eyelid aperture, another driver information sensing device 505 can be a driver control input device, such as the vehicle gas pedal, or a component of the gas pedal, for measuring the position of the gas pedal, and an additional driver information sensing device 505 can be another driver control input device, such as the vehicle brake pedal, or a component of the brake pedal, for measuring the position of the brake pedal. In other embodiments, driver information sensing device 505 can be comprised of one or more of a contact and/or contactless sensors and can include electric current/potential sensors (e.g., proximity, inductive, capacitive, electrostatic), subsonic, sonic, and ultrasonic sensors, vibration sensors (e.g., piezoelectric) visual, photoelectric, oxygen sensors, as well as any other kinds of devices, sensors, or systems that are capable of measuring driver information directly from the driver 545.

In one embodiment, the vehicle information sensing device 510 can measure vehicle information directly from a vehicle system of vehicle 500. For example, the vehicle information sensing device 510 can measure vehicle information directly from the vehicle 500, such as the lane position, lane deviation, linear and angular vehicle position, velocity and acceleration, distance from potential obstacles in front of, beside and behind the vehicle 500, reliance on cruise control or adaptive cruise control, reliance on assisted steering and reaction to known obstacles, such as construction barricades, traffic signals, and stopped vehicles.

As with the driver information sensing device 505, in some embodiments, one vehicle information sensing device 510 can be used to measure one or more types of vehicle information directly from the vehicle 500. In other embodiments, multiple vehicle information sensing devices 510 can be used to measure multiple types of vehicle information. For example, in one embodiment, the vehicle information sensing device 510 can include a camera for measuring lane position of the vehicle 500 and an accelerometer for measuring the acceleration of the vehicle 500. In further embodiments, the vehicle information sensing device 510 can be a camera for measuring lane position of the vehicle 500, another vehicle information sensing device 510 of the vehicle 500 can be an accelerometer for measuring the acceleration of the vehicle 500, and a further vehicle information sensing device 510 can be an ultrasonic detector for measuring the distance from the vehicle 500 to any potential obstacles located around the vehicle 500.

The driver alert device 540 is used to alert the driver 545 if a reduction in vehicle control occurs, namely if the driver safety factor, discussed below, does not exceed a predetermined driver safety alert threshold, discussed below, due to a low information transfer rate between the driver 545 and the vehicle 500. The driver alert device 540 can be an output device of the vehicle 500 that outputs a visual, mechanical, or audio signal to alert the driver 545 to the reduction in vehicle control, which would allow the driver 545 to take action, such as pulling the vehicle 500 over, stopping the vehicle 500, or swerving the vehicle 500.

The external information sensing device 520 can be used to measure information external to the vehicle 500, and thus the flow of information from the driver 545 to the vehicle 500 in reaction to the external information. The external information sensing device 520 can measure external information, such as, but not limited to, adjacent vehicles, road construction barricades, stopped traffic, animals, and pedestrians. It is contemplated that in some embodiments, one external information sensing device 520 can be used to measure one or more types of external information. In other embodiments, multiple external information sensing devices 520 can be used to measure multiple types of external information. For example, in one embodiment, the external information sensing device 520 can include a camera to sense an animal external to the vehicle 500, an inter-vehicular communication system for sensing other vehicles adjacent to the vehicle 500, and an ultrasonic proximity sensor for sensing objects near the vehicle 500. In another embodiment, one external information sensing device 520 can include a camera to sense an animal external to the vehicle 500, another external information system can include an inter-vehicular communication system for sensing other vehicles adjacent to the vehicle 500, and another external information system can include an ultrasonic proximity sensor for sensing objects near the vehicle 500.

The GPS 530 can optionally be present in the vehicle 500 and can be used to obtain the location, weather, and time of day traffic conditions at the location of the vehicle 500 for use during the normalization process of the information transfer rate between the driver 545 and the vehicle 500, in embodiments of the information transfer rate system 535, which normalize such information. It is recognized that normalizing the information transfer rate between the driver 545 and the vehicle 500 can be necessary due to the fact that a higher information transfer rate is required to maintain control of vehicle 500 in some driving conditions and a lower information transfer rate is required to maintain control of the vehicle 500 in other driving conditions. For example, curvy inner city roads during rush hour on snowy days require a higher information transfer rate from the driver 545 to the vehicle 500 to maintain control of the vehicle 500, than will long straight desolate roads in fair weather.

II. Driver to Vehicle Information Transfer Rate

Figure 2:
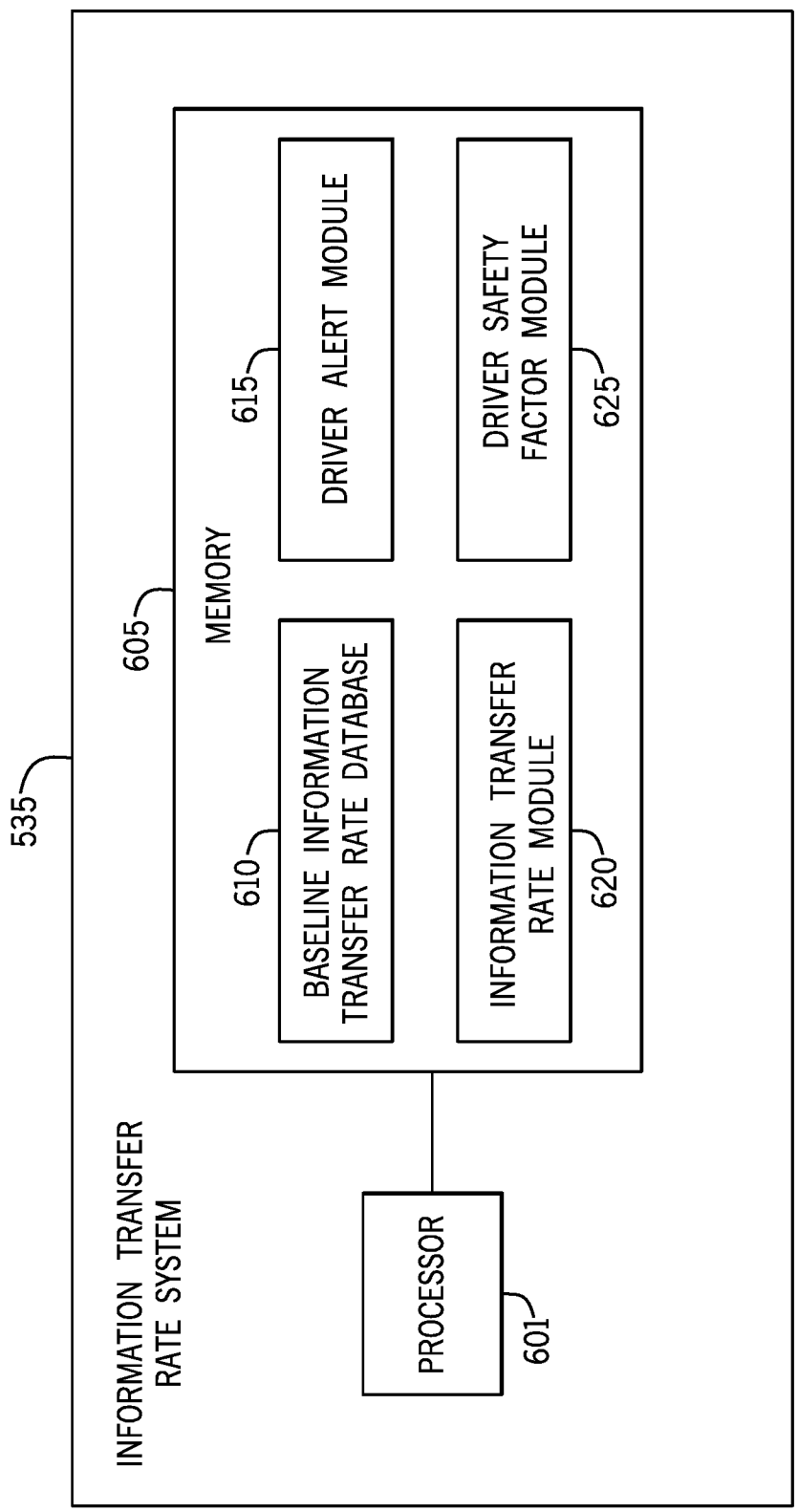
FIG. 2 is a schematic view of an information transfer rate system of FIG. 1 for determining the information transfer rate between a driver and vehicle according to an exemplary embodiment.

Turning now to FIG. 2, there is shown a schematic detailed view of an information transfer rate system 535 for determining the information transfer rate between a driver 545 and vehicle 500 according to an exemplary embodiment, which will be described with reference to the elements of FIG. 1. The information transfer rate system 535 comprises a computer processor 601 and a memory 605. Note that the information transfer rate system 535 comprises features, such as communication interfaces to the driver information sensing device 505, vehicle information sensing device 510, driver alert device 540, GPS 530, and optional external information sensing device 520 (FIG. 1). However, illustration of these features has been omitted for brevity purposes. Note that in other embodiments, the information transfer rate system 535 can also comprise additional features other than those illustrated in FIGS. 1 and 2.

In one embodiment, the processor 601 processes data signals and can comprise various computing architectures including a complex instruction set computer (CISC) architecture, a reduced instruction set computer (RISC) architecture, or an architecture implementing a combination of instruction sets. Although only a single processor is shown in FIG. 2, multiple processors can be included. The processor 601 can comprise an arithmetic logic device, a microprocessor, a general purpose computer, or some other information appliance equipped to transmit, receive, and process non-transitory electronic data signals from the memory 605, the driver information sensing device 505, the vehicle information sensing device 510, the driver alert device 540, the GPS 530, and the external information sensing device 520.

In one embodiment, the memory 605 stores instructions and/or data that can be executed by the processor 601. The instructions and/or data can comprise code (i.e. modules) for performing and and/or all of the techniques described herein. In one embodiment, the memory 605 comprises a baseline information transfer rate database 610, a driver alert module 615, an information transfer rate module 620, and a driver safety factor module 625. Note that in other embodiments, other modules than those shown in FIG. 2 can be used to perform the functionality described herein. The modules are adapted to communicate, via a bus (not shown), with the processor 601, the driver information sensing device 505, the vehicle information sensing device 510, the driver alert device 540, the GPS 530, and the optional external information sensing device 520.

In one embodiment, the information transfer rate module 620 receives driver information measured directly from the driver 545 from the driver information sensing device 505 in the form of a driver time series calculated according to the following equation:

$$D_x = \{d_{x1}, d_{x2} \ldots d_{xN}\} \quad (1)$$

where: $D_x$ is a time series which is an ordered collection of real values of driver information measured directly from the driver 545 using the driver information sensing device 505, and $d_{x1}$ (1≤i≤N) is a time series element of a real value of driver information measured directly from the driver 545 using the driver information sensing device 505.

Further, the information transfer rate module 620 receives vehicle information measured directly from the vehicle 500 from the vehicle information sensing device 510 in the form of a vehicle time series calculated according to the following equation:

$$V_y = \{v_{y1}, v_{y2} \ldots v_{yN}\} \quad (2)$$

where: $V_y$ is a time series which is an ordered collection of real values of vehicle information measured directly from the vehicle using the vehicle information sensing device 510, and $v_{yi}$ (1≤i≤N) is a time series element of a real value of vehicle information measured directly from the vehicle using the vehicle information sensing device 510.

The information transfer rate module 620 calculates an information transfer rate between the driver and vehicle using the vehicle information measured directly from the vehicle 500 by the vehicle information sensing device 510 and the driver information measured directly from the driver 545 by the driver information sensing device 505. The information transfer rate between the driver 545 and the vehicle 500 is calculated using conditional and transfer entropies. Conditional entropy quantifies the amount of information needed to describe the outcome of a random variable Y given that the value of another random variable X is known. Further, transfer entropy is a non-parametric statistic measuring the amount of directed (time-asymmetric) transfer of information between two random processes. Transfer entropy from a process X to another process Y is the amount of uncertainty reduced in future values of Y by knowing the past values of X given past values of Y. Thus, in one embodiment, the information transfer rate system 535 measures the reduction in uncertainty in V (vehicle) given historical segments of both V and D (driver) with respect to the reduction of uncertainty in V given only historical segments of V. In other words, the information transfer rate system 535 ascertains how much knowing D assists with determining V.

More specifically, in one embodiment, the information transfer between the driver 545 and the vehicle 500 is calculated according to the following equation:

$$T_{D_x \to V_y} = H(v_{yi} | v_{y(i-t)}^{(l)}) - H(v_{yi} | v_{y(i-t)}^{(l)}, d_{x(i-\tau)}^{(k)}) \quad (3)$$

where: $T_{D_x \to V_y}$ is a transfer entropy from a driver measurement x to a vehicle measurement y, $H(v_{yi} | v_{y(i-t)}^{(l)})$ is the conditional entropy between $v_{yi}$ and a prior segment of $V_y$ that is l points long and delayed by t points i.e. $v_{y(i-t)}^{(l)} = \{v_{y(i-t-l+1)}, v_{y(i-t-l+2)}, \ldots, v_{y(i-t)}\}$, and $H(v_{yi} | v_{y(i-t)}^{(l)}, d_{x(i-\tau)}^{(k)})$ is the conditional entropy between $v_{yi}$ and a prior segment of $V_y$ further conditioned on a prior segment of $D_x$ that is k points long and delayed by τ time points i.e. $d_{x(i-\tau)}^{(k)} = \{d_{x(i-\tau-k+1)}, d_{x(i-\tau-k+2)}, \ldots, d_{x(i-\tau)}\}$. Note that further conditioning of $v_{yi}$ on $d_{x(i-\tau)}^{(k)}$ cannot increase the uncertainty in $v_i$ so $H(v_{yi} | v_{y(i-t)}^{(l)}) \geq H(v_{yi} | v_{y(i-t)}^{(l)}, d_{x(i-\tau)}^{(k)})$ and $T_{D_x \to V_y}$ is always greater than zero. This information transfer occurs over a period of N/FS seconds where FS is the data sampling frequency. The information transfer can be divided by the time period (N/FS) to form an information transfer rate measured in bits per second.

The information transfer rate module 620 can be configured to use all of the driver information and vehicle information separately or in combination to form various transfer information sums and calculate an information transfer rate between the driver and vehicle. For example, in one embodiment, a total information transfer $T_{D \to V}$ is calculated by the information transfer rate module 620 using the following equation:

$$T_{D \to V} = \Sigma_{x=1}^{X} \Sigma_{y=1}^{Y} H(v_{yi} | v_{y(i-t)}^{(l)}) - H(v_{yi} | v_{y(i-t)}^{(l)}, d_{x(i-\tau)}^{(k)}) \quad (4)$$

which is the total sum over every possible combination of all driver information measured directly from the driver 545 (X in total) by the driver information sensing device 505 and all vehicle measurements measured directly from the vehicle (Y in total) by the vehicle information sensing device 510 for a total of X*Y individual sums.

In other embodiments, the information transfer rate module 620 can be configured to use only some of the driver information and vehicle information separately or in combination to form various transfer information sums and calculate an information transfer rate between the driver and vehicle. For example, in one embodiment, a sum of the combinations of driver information measurements 3 through 5 measured directly from the driver 545 by the driver information sensing device 505 and vehicle measurements 2 through 6 measured directly from the vehicle 500 by the vehicle information sensing device 510, represented as $T_{D_{3-5} \to V_{2-6}}$, can be calculated by the information transfer rate module 620 using the following equation:

$$T_{D_{3-5} \to V_{2-6}} = \Sigma_{x=3}^{5} \Sigma_{y=2}^{6} H(v_{yi} | v_{y(i-t)}^{(l)}) - H(v_{yi} | v_{y(i-t)}^{(l)}, d_{x(i-\tau)}^{(k)}) \quad (5)$$

Thus, as can be seen, the information transfer rate between the driver 545 and the vehicle 500 is calculated by the information transfer rate module 620 using entropy. More specifically, the transfer rate is calculated by information transfer rate module 620, using transfer entropy and conditional entropy. Each of equations 3-5, discussed above, provide an information transfer rate between the driver 545 and the vehicle 500 using transfer entropy and conditional entropy.

In some embodiments, information transfer rate module 620 also uses the external measurements, measurements of information external to the vehicle 500, provided by external information sensing device 520 to calculate the information transfer rate between the driver and vehicle.

In some embodiments, the information transfer rate module 620 normalizes the calculated information transfer rate based on at least one of the type of driver information measured directly from the driver 545 and the driving conditions. The driving conditions include at least one of a particular road condition, weather condition, time of day, and traffic condition. Further, in some embodiments, the information transfer rate module 620 also uses the information provided by the GPS 530 of the vehicle 500 to normalize the information transfer rate for the driving conditions. In one embodiment, the information transfer rate module 620 determines the maximum information transfer rate by adjusting the parameters t, τ, k, l of the above discussed equations to determine the maximum information transfer rate between the driver 545 and the vehicle 500. Specifically, in one embodiment, the parameters t, τ, k, l are adjusted based on at least one of a type of driver information measured directly from the driver 545 and the driving conditions. The driving conditions include at least one of a particular road condition, a weather condition, a time of day, and a traffic condition.

In some embodiments, the information transfer rates between the driver and vehicle for all driver measurements and all vehicle measurements are calculated by the information transfer rate module 620, tracked by the processor 601, and stored in the memory 605 to establish personal normatives for each driver 545 of the vehicle 500. These personal normatives are then stored in the baseline information transfer rate database 610 as baseline information transfer rate values for the driver 545, for retrieval and use by the driver safety factor module 625.

In one embodiment, the baseline information transfer rate database 610 contains baseline information transfer rate values for maintaining control of the vehicle 500. In some embodiments, the baseline information transfer rate database 610 only contains one baseline information transfer rate value. In other embodiments, the baseline information transfer rate database 610 contains at least two different baseline information transfer rate values for the driver 545, with each value adjusted for road conditions. Road conditions can include, but are not limited to, one or more of type of road, weather, time of day, and traffic conditions.

In one embodiment, the driver safety factor module 625 calculates a driver safety factor for the driver 545 of the vehicle 500 in real time. The driver safety factor is the ratio of the rate of information transfer between the driver and vehicle calculated by the information transfer rate module 620 and the baseline information transfer rate retrieved from the baseline information transfer rate database 610 by the driver safety factor module 625. In the event that baseline information transfer rate database 610 contains multiple baseline information transfer rates for the driver 545 of vehicle 500, the driver safety factor module 625 retrieves the baseline information transfer rate that most closely matches the real time road conditions for the road on which the vehicle 500 is travelling.

In one embodiment, the driver alert module 615 compares the driver safety factor calculated by the driver safety factor module 625 to a predetermined driver safety alert threshold. In the event that the calculated driver safety factor does not exceed the predetermined driver safety alert threshold, an alert is issued to the driver 545 using the driver alert device 540, as discussed above. The alert signals to the driver 545 that the real time information transfer rate between the driver and vehicle has fallen below the information transfer rate necessary for the driver 545 to maintain suitable control of the vehicle 500 given the present road conditions.

With additional reference to FIG. 2, the information transfer rate system 535 can include the processor 601 and the memory 605. The system 535 can further include the baseline information transfer rate database 610, the driver alert module 615, the information transfer rate module 620, and the driver safety factor module, each of which can be stored in the memory 605. The baseline information transfer rate database 610 can include baseline information transfer rates between the driver 545 and the vehicle 500 that are necessary for control of the vehicle 500 under a given set of road conditions. The information transfer rate module 620 calculates the actual information transfer rate between the driver 545 and the vehicle 500 using the information transfer rate module 620. The information transfer rate module 620 also compares the baseline rate for the real time conditions of the vehicle 500 to the actual information transfer rate between the driver 545 and the vehicle 500 in real time.

From this comparison, it can be determined if a driver 545 is in suitable control of the vehicle 500.

The driver safety factor module 625 can calculate a real time driver safety factor, which is the ratio of the calculated rate of information transfer to a predetermined information transfer rate. The driver alert module 615 compares the calculated real time driver safety factor to a predetermined driver safety alert threshold. The driver alert module 615 provides an alert to the driver 545 if the calculated real time driver safety factor is low. A calculated real time driver safety factor is low if the calculated real time driver safety factor does not exceed the predetermined driver safety alert threshold, when the comparison is performed by the driver alert module 615. The driver alert module 615 alerts the driver 545, using the driver alert device 540, when the calculated real time driver safety factor is low, thereby alerting to the presence of an impaired driver 545.

III. Methods for Driver to Vehicle Information Transfer Rate

Figure 3:
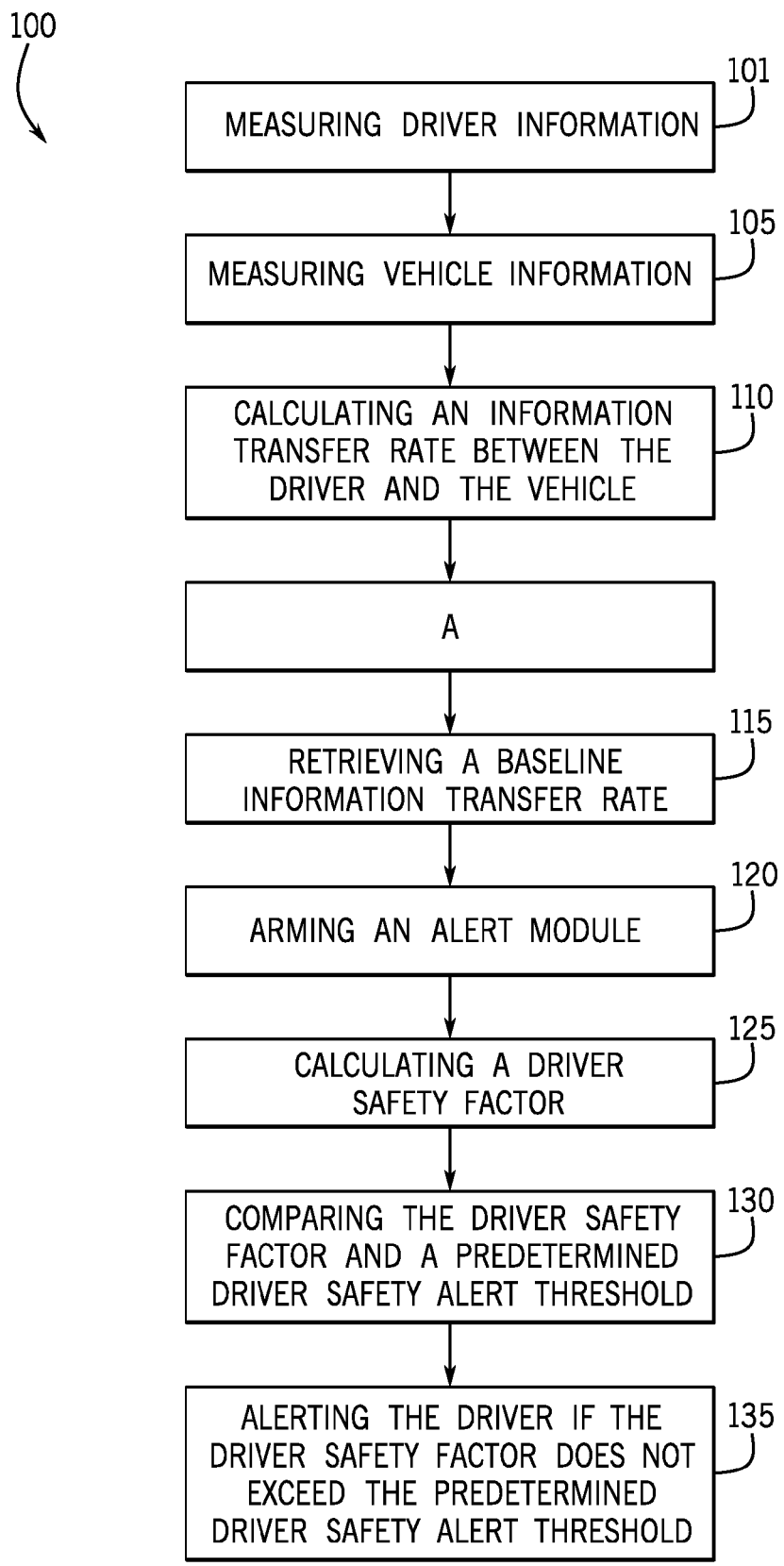
FIG. 3 is a process flow diagram of a method for determining an information transfer rate between a driver and vehicle according to an exemplary embodiment.

With reference to FIG. 3, a process flow diagram of a method 100 for determining an information transfer rate between a driver 545 and a vehicle 500 according to an exemplary embodiment is shown. The method 100 of FIG. 3 will be described with reference to FIGS. 1 and 2, though the method 100 of FIG. 3 can also be used with other systems and embodiments. As will be discussed herein, the blocks shown in FIG. 3 can include more detailed processes as explained with FIGS. 4-6 and can be connected via connector A. However, it is understood that the methods shown in FIGS. 3-6 can be connected and/or flow at other points other than connector A. Further, in some embodiments, which will be discussed herein. The one or more of the blocks shown in FIGS. 3-6 can be incorporated with one or more of the blocks shown in FIGS. 7A, 7B, and 7C.

In block 101 of FIG. 3, driver information is measured directly from the driver 545. In one embodiment, this driver information is measured using the driver information sensing device 505, as described above. In block 105, vehicle information is measured directly from the vehicle 500. In one embodiment, this vehicle information is measured using the vehicle information sensing device 510, as described above.

In block 110, an information transfer rate between the driver 545 and the vehicle 500 is calculated using the driver information measured directly from the driver 545 in block 101 and the vehicle information measured directly from the vehicle in block 105. In one embodiment, this information transfer rate is calculated using the information transfer rate module 620, as described above. Thus, as can be seen, the information transfer rate between the driver 545 and the vehicle 500 is calculated using entropy. More specifically, in some embodiments, the transfer rate is calculated, using transfer entropy and conditional entropy, as is shown above in each of equations 3-5.

At block 115, a baseline information transfer rate is retrieved from the baseline information transfer rate database 610 by the driver safety factor module 625. As was stated above, in one embodiment, the baseline information transfer rate database 610 contains baseline information transfer rate values for maintaining vehicular control. In some embodiments, the baseline information transfer rate database 610 only contains one baseline information transfer rate value. In other embodiments, the baseline information transfer rate database 610 contains at least two different baseline information transfer rate values for the driver 545, with each value adjusted for road conditions. Road conditions can include, but are not limited to, one or more of type of road, weather, time of day, and traffic conditions. In the event that the baseline information transfer rate database 610 has multiple information transfer rates for the driver 545 of vehicle 500, the driver safety factor module 625 retrieves the baseline information transfer rate that most closely matches the real time road conditions for the road on which the vehicle 500 is travelling.

In block 120, once the baseline information transfer rate is retrieved from the baseline information transfer rate database 610, a driver alert module 615 is armed. Information transfer rate system 535 arms driver alert module 615 after a baseline information transfer rate is retrieved from the baseline information transfer rate database 610 by the driver safety factor module 625. Upon arming, driver alert module 615 is prepared to compare a predetermined driver safety alert threshold, stored in memory 605, to the driver safety factor calculated by the driver safety factor module 625. Driver alert module 615 performs the comparison when the driver safety factor calculated by the driver safety factor module 625 is provided to the driver alert module 615 by driver safety factor module 625.

At block 125, a driver safety factor is calculated. In one embodiment, the driver safety factor is the ratio of the calculated rate of information transfer to a predetermined information transfer rate. In one embodiment, the driver safety factor is calculated by the driver safety factor module 625, as described above, using the information transfer rate calculated in block 110 and the baseline information transfer rate retrieved from the baseline information transfer rate database 610 in block 115.

In block 130, the driver safety factor calculated in block 125 is compared to a predetermined driver safety alert threshold. In one embodiment, this comparison is performed by the driver alert module 615, as described above. In block 135, the driver 545 is alerted if the driver safety factor value does not exceed the predetermined driver safety alert threshold value. The driver safety factor and predetermined driver safety alert threshold data type can be, but is not limited to, numeric, non-numeric, discrete, or continuous. In one embodiment, if the comparison made by the driver alert module 615 in block 130 indicates that the driver safety factor does not exceed the predetermined driver safety alert threshold, then the driver 545 is alerted using the driver alert device 540, as described above.

Figure 4:
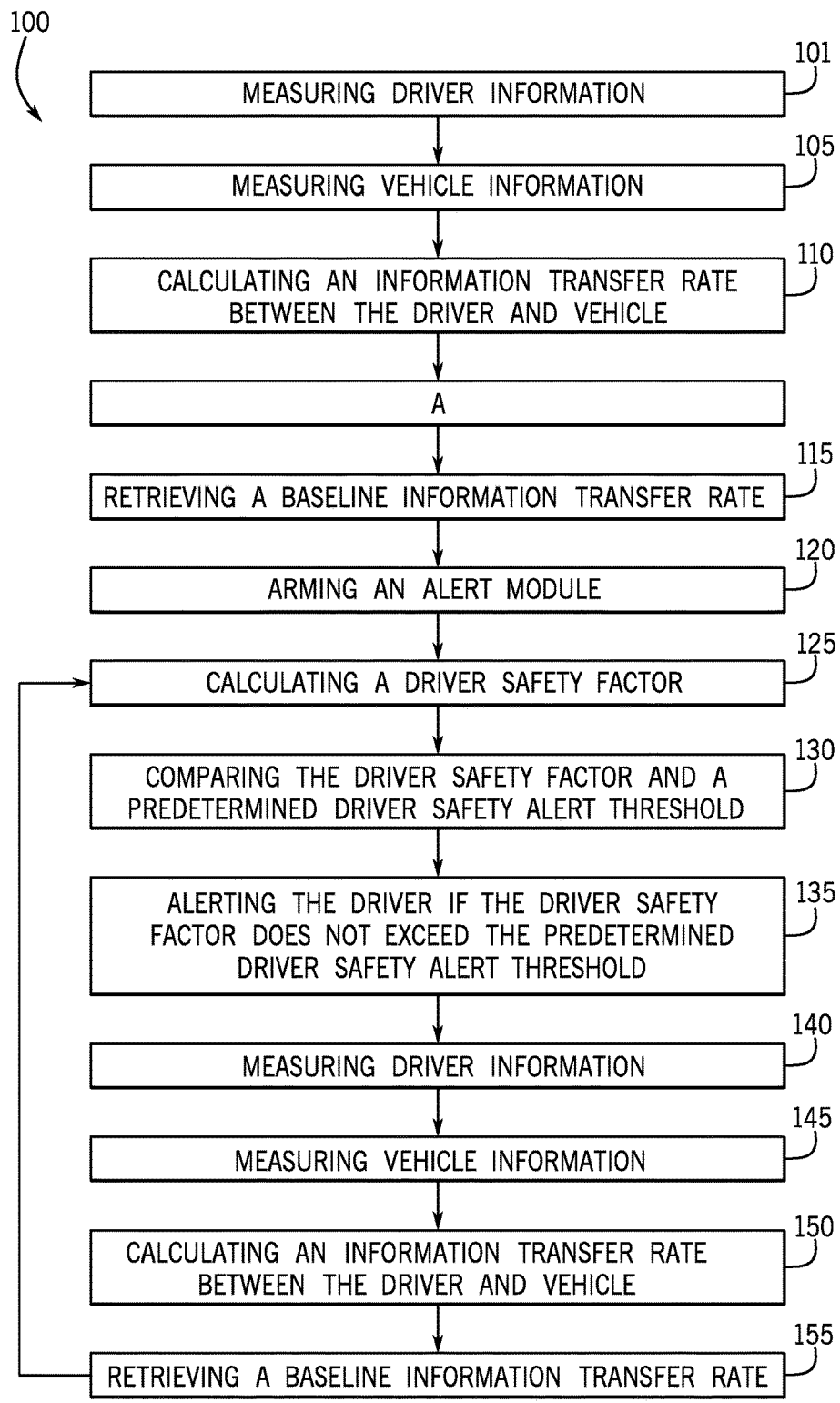
FIG. 4 is a process flow diagram of a real time continuously repeating method for determining an information transfer rate between a driver and vehicle according to an exemplary embodiment.

With reference to FIG. 4, a process flow diagram of a method 100 for determining an information transfer rate between a driver 545 and a vehicle 500 according to an exemplary embodiment is shown. The method of FIG. 4 will be described with reference to FIGS. 1, 2 and 3, though the method of FIG. 4 can also be used with other systems and embodiments. FIG. 4 contains additional blocks beyond those shown in FIG. 3, namely blocks 140 to 155, which clearly show how this method is continuously repeated in real time by the information transfer rate system 535 while the vehicle 500 is travelling.

In the embodiment shown in FIG. 4, after block 135, driver information is again measured directly from the driver 545 in block 140. In one embodiment, this driver information is measured using the driver information sensing device 505, as described above. Following block 140, vehicle information is measured directly from the vehicle 500 again in block 145. In one embodiment, this vehicle information is measured using the vehicle information sensing device 510, as described above.

In block 150, an information transfer rate between the driver 545 and the vehicle 500 is again calculated using the driver information measured directly from the driver 545 in block 140 and the vehicle information measured directly from the vehicle 500 in block 145. In one embodiment, this information transfer rate is calculated using the information transfer rate module 620, as described above.

Following block 150, a baseline information transfer rate is once again retrieved from the baseline information transfer rate database 610 and provided to the driver safety factor module 625 in block 155, as described above. As was stated above, in one embodiment, the baseline information transfer rate database 610 contains baseline information transfer rate values for maintaining vehicular control. In some embodiments, the baseline information transfer rate database 610 only contains one baseline information transfer rate value. In other embodiments, the baseline information transfer rate database 610 contains at least two different baseline information transfer rate values for the driver 545, with each value adjusted for road conditions. Road conditions can include, but are not limited to, one or more of type of road, weather, time of day, and traffic conditions. In the event that the baseline information transfer rate database 610 has multiple information transfer rates for the driver 545 of the vehicle 500, the driver safety factor module 625 retrieves the baseline information transfer rate that most closely matches the real time road conditions for the road on which the vehicle 500 is travelling.

After the baseline information transfer rate is retrieved from the baseline information transfer rate database 610 and provided to the driver safety factor module 625 in block 155, the method returns to block 125.

Figure 5:
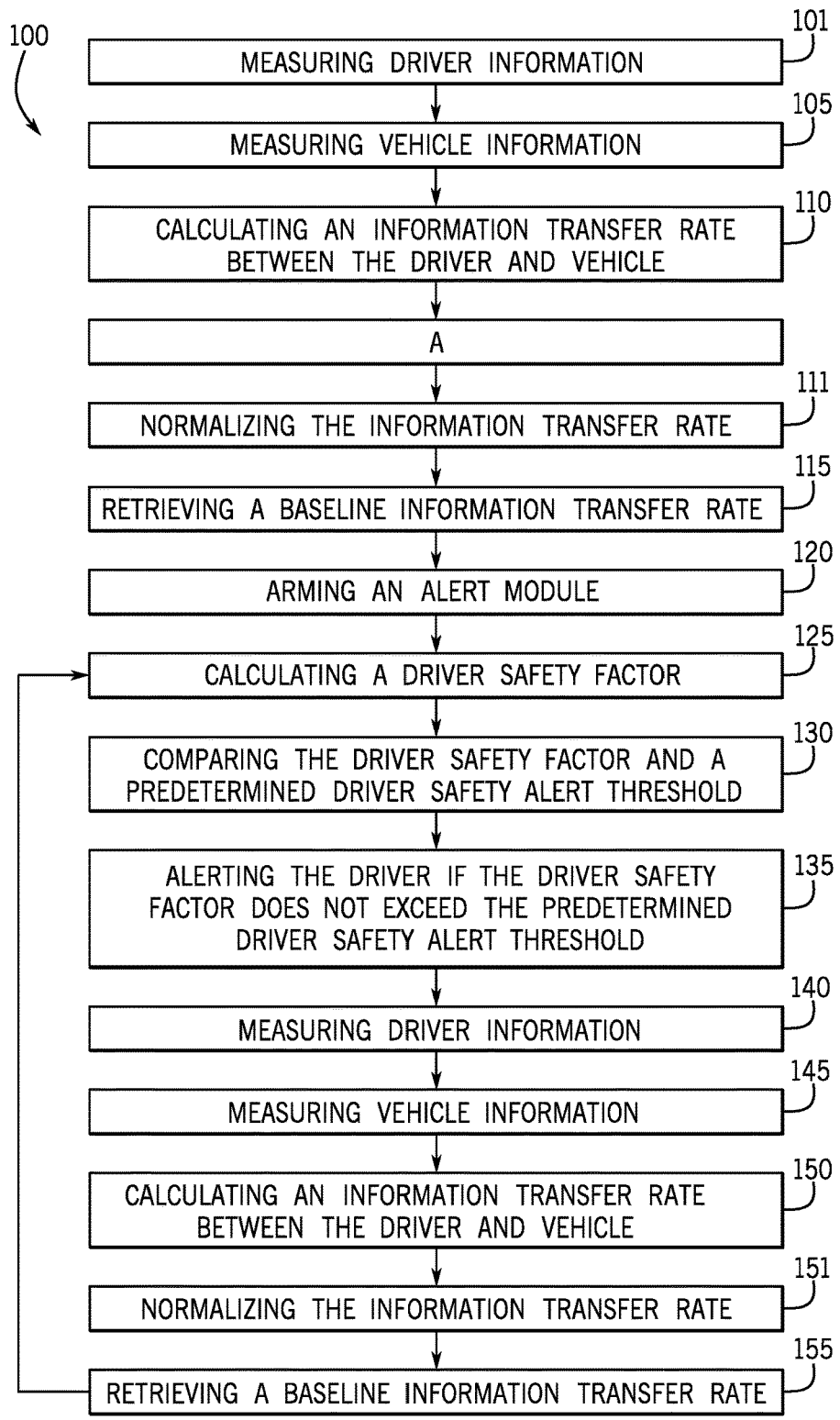
FIG. 5 is a process flow diagram of a method for determining a normalized information transfer rate between a driver and vehicle according to an exemplary embodiment.

With reference to FIG. 5, a process flow diagram of a method 100 for determining an information transfer rate between a driver 545 and a vehicle 500 according to an exemplary embodiment is shown. The method of FIG. 5 will be described with reference to FIGS. 1, 2, 3, and 4 though the method of FIG. 5 can also be used with other systems and embodiments. FIG. 5 contains additional blocks beyond those shown in FIGS. 3 and 4, namely blocks 111 and 151.

In the embodiment shown in FIG. 5, the information transfer rate between the driver 545 and vehicle 500 calculated in block 110 by information transfer rate module 620 is normalized in block 111 by the information transfer rate module 620, as was discussed above, based on at least one of a type of driver information measured directly from the driver 545 and the driving conditions. The driving conditions include, but are not limited to, at least one of a particular road condition, a weather condition, a time of day, and a traffic condition. Further, in some embodiments, the information transfer rate module 620 also uses the information provided by the GPS 530 of the vehicle 500 to normalize the information transfer rate for the driving conditions.

Similarly, in block 151 of FIG. 5, the information transfer rate between the driver 545 and vehicle 500 calculated in block 150 by information transfer rate module 620 is normalized in block 151 by information transfer rate module 620, as was discussed above, based on at least one of a type of driver information measured directly from the driver 545 and the driving conditions. The driving conditions include, but are not limited to, at least one of a particular road condition, a weather condition, a time of day, and a traffic condition. Further, in some embodiments, the information transfer rate module 620 also uses the information provided by the GPS 530 of the vehicle 500 to normalize the information transfer rate for the driving conditions.

Figure 6:
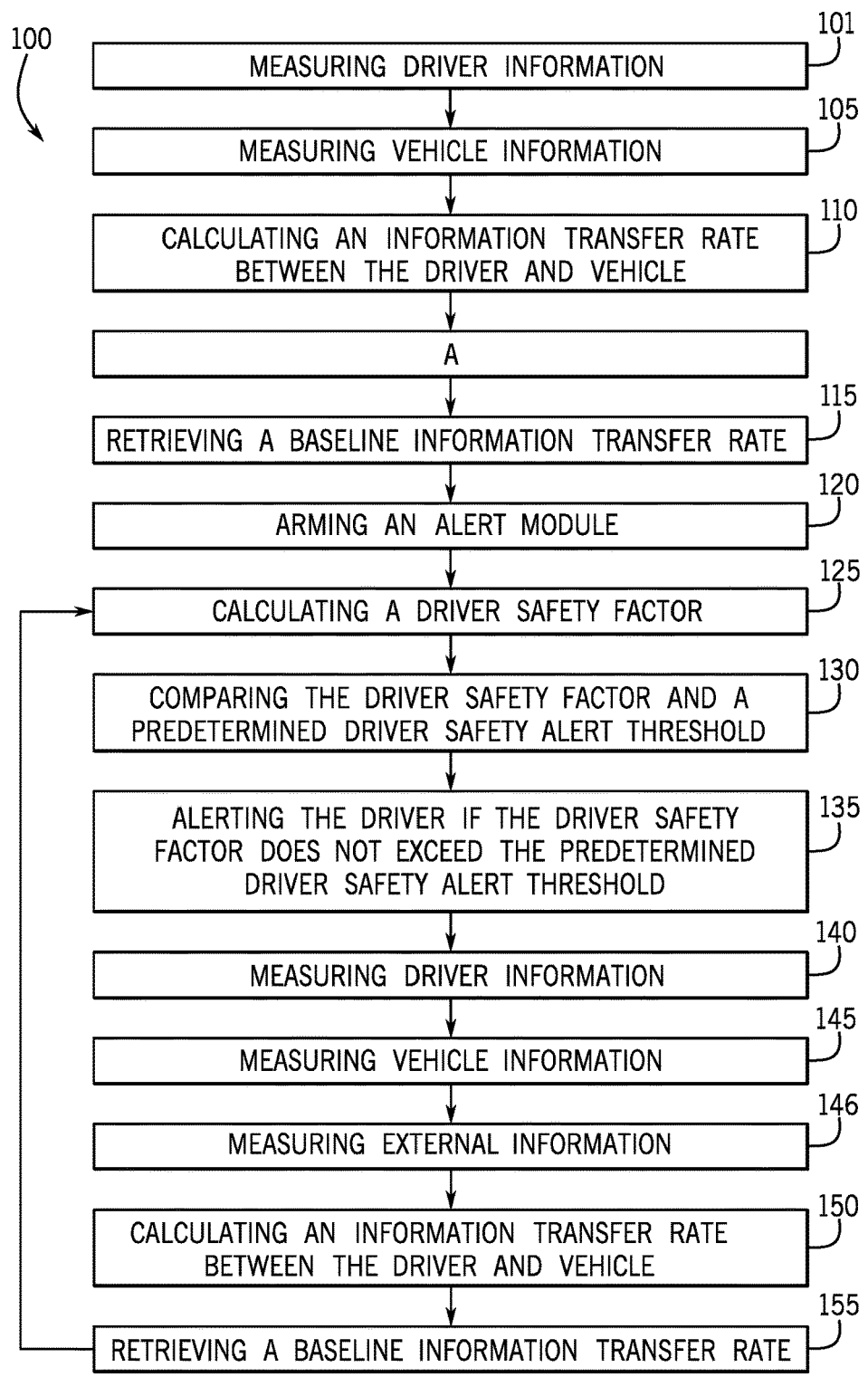
FIG. 6 is a process flow diagram of a method for determining an information transfer rate between a driver and vehicle using external information according to an exemplary embodiment.

With reference to FIG. 6, a process flow diagram of a method 100 for determining an information transfer rate between a driver 545 and a vehicle 500 according to an exemplary embodiment is shown. The method of FIG. 6 will be described with reference to FIGS. 1, 2, 3, 4, and 5 though the method of FIG. 6 can also be used with other systems and embodiments. FIG. 6 contains additional blocks beyond those of the embodiments of the method 100 shown in FIGS. 3-5, namely blocks 106 and 146. Note that in other embodiments, other blocks can be performed than those illustrated in FIG. 6.

In block 105, external information is measured external of the vehicle 500. In one embodiment, this external information is measured using the external information sensing device 520, as described above. This external information is used by the information transfer rate module 620 in block 110, in conjunction with the driver information measured in block 101 and the vehicle information measured in block 105, to calculate an information transfer rate between the driver 545 and vehicle 500 in block 110, as described above.

Similarly, in block 146, external information is measured external of the vehicle 500. In one embodiment, this external information is measured using the external information sensing device 520, as described above. This external information is used by the information transfer rate module 620 in block 150, in conjunction with the driver information measured in block 140 and vehicle information measured in block 145, to calculate an information transfer rate between the driver 545 and vehicle 500 in block 150, as described above.

Thus, disclosed above are embodiments of a system and method for calculating the information transfer rate between the driver 545 and the vehicle 500 by information transfer rate module 620 using information measured directly from the driver 545 and information measured directly from the vehicle 500. The information transfer rate is calculated in real time using conditional and transfer entropies. The calculated information transfer rate is used to determine if the driver 545 of vehicle 500 is in suitable control of vehicle 500 or the driver 545 is experiencing an impairment that prevents the driver 545 from having suitable control of vehicle 500.

IV. Methods for Driver to Vehicle Information Transfer Rate and Vehicle to Driver Information Transfer Rate In the embodiments discussed above, an information transfer rate is measured from the driver to the vehicle. An information transfer rate from the driver to the vehicle (i.e., $T_{D_x \to V_y}$) describes a forward flow of information from the driver to the vehicle. The forward flow of information is required to maintain control of the vehicle. For example, as discussed above with FIGS. 1-6, the driver 545 must transmit information by way of one or more driver control input devices to produce changes in vehicle acceleration, velocity, lane position, and direction. Thus, as an illustrative example, the driver 545 can turn a steering wheel (not shown) of the vehicle 500 thereby transmitting information to the vehicle 500 via the steering wheel to produce a change in the direction of the vehicle 500. Said differently, turning a steering wheel is a driver maneuver (e.g., a driver input) that manifests into a vehicle maneuver, namely, a change in the vehicle direction. In some embodiments, a reduction in information transfer from the driver 545 to the vehicle 500 can signal a reduction in vehicular control, as could be the case with a driver who is distracted, drowsy, intoxicated or experiencing a medical emergency.

Additionally, in some embodiments, an information transfer rate from the vehicle to the driver (i.e., $T_{V_y \to D_x}$) describes a reverse flow of information from the vehicle to the driver. The reverse flow of information is required to maintain control of the vehicle. For example, and with reference to FIGS. 1-2, the vehicle 500 can perform a vehicle maneuver in response to an external condition (e.g., external disturbance). For example, an external condition can be a road condition, a weather condition, among others. The vehicle maneuver in response to the external condition can include changes in vehicle acceleration, velocity, lane position, and direction. As an illustrative example, a wind gust can produce a vehicle maneuver, for example, a change in lateral acceleration of the vehicle 500. The vehicle 500 transmits information produced by the vehicle maneuver to the driver 545. The driver 545 can cause a driver response maneuver (e.g., by way of one or more driver control input devices) in response to the vehicle maneuver caused by the external condition. Thus, the driver 545 is performing a corrective or reactive input to the vehicle 500. Referring again to the illustrative example mentioned above, based on the change in lateral acceleration of the vehicle 500, the driver 545 can turn the steering wheel in the opposite direction of the lateral acceleration to correct the direction of the vehicle 500. As a second illustrative example, a driver with decreased vehicular control (e.g., impaired) has a point of focus (e.g., eye gaze) on road segments immediately in front of a vehicle rather than far down the road, which can lead to repeated back and forth interactions of the vehicle with lane boundaries producing a so called "weaving" pattern. These lane boundary interactions also result in strong corrective maneuvers in response to external vehicle disturbances which result in increased vehicle to driver information flow. Based on the above, in some embodiments, increase in information transfer from the vehicle 500 to the driver 545 can signal a reduction in vehicular control, as could be the case with a driver who is distracted, drowsy, intoxicated or experiencing a medical emergency.

Figure 7A:
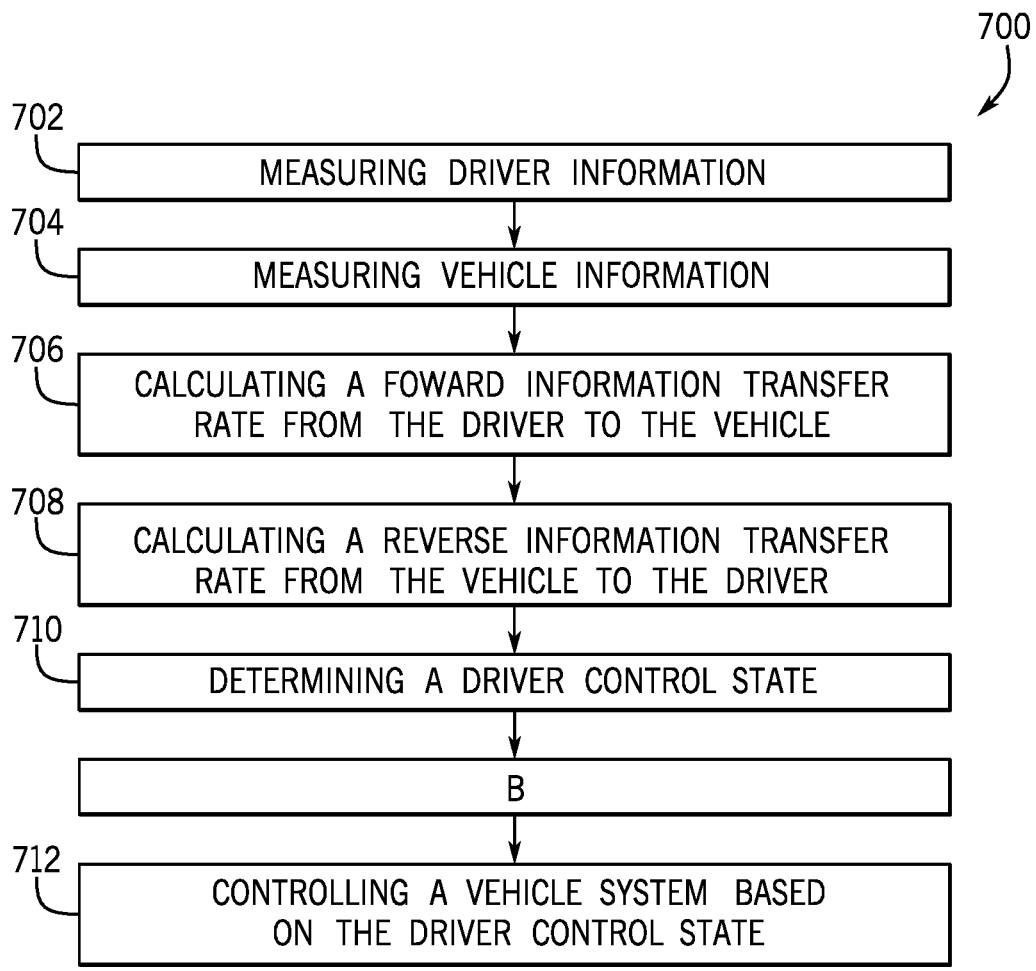
FIG. 7A is a process flow diagram of a method for determining a forward information transfer rate and a reverse information transfer rate according to an exemplary embodiment.

Accordingly, information transfer from the driver to the vehicle (forward information transfer rate) and/or information transfer from the vehicle to the driver (reverse information transfer rate) can be used to determine vehicular control. Determination of forward information transfer rate and reverse information transfer rate will now be described with reference to method 700 of FIG. 7A. FIG. 7A will be described with reference to FIGS. 1 and 2, though the method 700 can also be used with other systems and embodiments. As will be discussed herein, the blocks shown in FIG. 7A can include more detailed processes as explained with FIGS. 7B and 7C and can be connected via connector B. However, it is understood that the methods shown in FIGS. 7A, 7B, and 7C can be connected and/or flow at other points other than connector B. Additionally, it is understood that blocks of the method 700 can be implemented, in whole or in part, with blocks of the methods shown in FIGS. 3-6.

At block 702, the method 700 includes measuring driver information. Similar to block 101 of FIG. 3, in one embodiment, the driver information is measured using the driver information sensing device 505, as described above. At block 704, the method 700 includes measuring vehicle information. Similar to block 105 of FIG. 3, in one embodiment, the vehicle information is measured using the vehicle information sensing device 510, as described above.

At block 706, the method 700 includes calculating a forward information transfer rate from the driver to the vehicle ($T_{D_x \to V_y}$), and at block 708, calculating a reverse information transfer rate from the vehicle to the driver ($T_{V_y \to D_x}$). Specifically, block 706 can include calculating a forward information transfer rate from the driver 545 to the vehicle 500 using the driver information and the vehicle information over a period of time and/or one or more time segments over the period of time. Further, block 708 can include calculating a reverse information transfer rate from the vehicle 500 to the driver 545 using the driver information and the vehicle information over the period of time and/or one or more time segments over the period of time. In one embodiment, the forward information transfer rate and the reverse information transfer rate are calculated using the information transfer rate module 620.

As discussed above in Section II and with block 110 of FIG. 3, information transfer rate can be calculated using transfer entropy and conditional entropy. A forward information transfer rate from the driver 545 to the vehicle 500 is calculated according to equation (3) discussed above. More specifically, calculating the forward information transfer rate at block 706 includes calculating the forward information transfer rate as a transfer entropy from a driver measurement x to a vehicle measurement y. The driver measurement x can be derived from the driver information, for example, the driver time series $D_x$ shown in equation (1) above. Further, the vehicle measurement y can be derived from the vehicle information, for example, the vehicle time series $V_y$ shown in equation (2) above. Accordingly, the driver measurement x is a value of driver information at a time series segment, and the vehicle measurement y is a value of vehicle information at a time series segment. In some embodiments discussed herein with respect to a forward information transfer rate, the driver measurement x can be referred to as a forward driver measurement x and the vehicle measurement y can be referred to as a forward vehicle measurement y.

As shown in equation (3) above, the transfer entropy of the forward information transfer rate is conditioned on a prior driver measurement x and a prior vehicle measurement y. More specifically, there is a conditional entropy between $v_{yi}$ and a prior segment of $v_y$ that is l points long and delayed by t points i.e. $v_{y(i-t)}^{(l)} = \{v_{y(i-t-l+1)}, v_{y(i-t-l+2)}, \ldots, v_{y(i-t)}\}$, and $H(v_{yi}|v_{y(i-t)}^{(l)}, d_{x(i-\tau)}^{(k)})$ is the conditional entropy between $v_i$ and a prior segment of $V_y$ further conditioned on a prior segment of $D_x$ that is k points long and delayed by $\tau$ time points i.e. $d_{x(i-\tau)}^{(k)} = \{d_{x(i-\tau-k+1)}, d_{x(i-\tau-k+2)}, \ldots, d_{x(i-\tau)}\}$. In one embodiment, which will be described herein, the forward information transfer rate can be calculated according to a first time delay that corresponds to a maximal point of the forward information rate. For example, in equation (3) t time points can be a first time delay. The first time delay can be predetermined. The forward information transfer rate can be calculated at the first time delay and/or can be calculated at multiple intervals according to the first time delay over the period of time. As discussed above with equation (4) and equation (5), the information transfer rate module 620 can be configured to use all of the driver information and vehicle information separately or in combination to calculate a forward information transfer rate.

In one embodiment, a reverse information transfer rate from the vehicle 500 to the driver 545 is calculated according to the following equation:

$$T_{V_y \to D_x} = H(d_{xi}|d_{x(i-\tau)}^{(k)}) - H(d_{xi}|d_{x(i-\tau)}^{(k)}, v_{y(i-t)}^{(l)}) \quad (6)$$

where: $T_{V_y \to D_x}$ is a transfer entropy from a vehicle measurement y to a driver measurement x. The transfer entropy of the reverse information transfer rate is conditioned on a prior vehicle measurement y and a prior driver measurement x. More specifically, equation (6) includes $H(d_{xi}|d_{x(i-\tau)}^{(k)})$, which is a conditional entropy between $d_{xi}$ and a prior segment of $D_x$ that is k points long and delayed by $\tau$ points i.e. $d_{x(i-\tau)}^{(k)} = \{d_{x(i-\tau-k+1)}, d_{x(i-\tau-k+2)}, \ldots, d_{x(i-\tau)}\}$, and $H(d_{xi}|d_{x(i-\tau)}^{(k)}, v_{y(i-t)}^{(l)})$, which is a conditional entropy between $d_{xi}$ and a prior segment of $D_x$ further conditioned on a prior segment of $V_y$ that is l points long and delayed by t time points i.e. $v_{y(i-t)}^{(l)} = \{v_{y(i-t-l+1)}, v_{y(i-t-l+2)}, \ldots, v_{y(i-t)}\}$. Note that further conditioning of $d_{xi}$ on $v_{y(i-t)}^{(l)}$ cannot increase the uncertainty in $d_{xi}$ so $H(d_{xi}|d_{x(i-\tau)}^{(k)}) \geq H(d_{xi}|d_{x(i-\tau)}^{(k)}, v_{y(i-t)}^{(l)})$ and $T_{V_y \to D_x}$ is always greater than zero.

The driver measurement x can be derived from the driver information, for example, the driver time series $D_x$ shown in equation (1) above. Further, the vehicle measurement y can be derived from the vehicle information, for example, the vehicle time series $V_y$ shown in equation (2) above. Accordingly, the driver measurement x is a value of driver information at a time series segment, and the vehicle measurement y is a value of vehicle information at a time series segment. In some embodiments discussed herein with respect to a reverse information transfer rate, the driver measurement x can be referred to as a reverse driver measurement x and the vehicle measurement y can be referred to as a reverse vehicle measurement y.

In one embodiment, which will be described herein, the reverse information transfer rate can be calculated according to a second time delay that corresponds to a maximal point of the reverse information transfer rate. For example, in equation (6) $\tau$ time points can be as a second time delay. The second time delay can be predetermined. The reverse information transfer rate can be calculated at the second time delay and/or can be calculated at multiple intervals according to the second time delay over the period of time. As discussed above with equation (4) and equation (5), the information transfer rate module 620 can be configured to use all of the driver information and vehicle information separately or in combination to calculate a reverse information transfer rate.

In some embodiments, the information transfer rate module 620 calculates a plurality of forward information transfer rates and a plurality of reverse information transfer rates over a period of time. In this embodiment, the information transfer rate module 620 calculates the plurality of forward information transfer rates in the form of a forward information transfer rate time series according to the following equation:

$$T_{DV} = \{T_{D_x \to V_{y1}}, T_{D_x \to V_{y2}} \ldots T_{D_x \to V_{yi}} \ldots T_{D_x \to V_{yn}}\} \quad (7)$$

where: $T_{DV}$ ($1 \leq i \leq N$) is a time series, which is an ordered collection of real values of forward information transfer rate and each value in the time series is an estimation of forward information transfer rate at a given time equal to i/FS where FS is the sample rate and N is the number of elements in the time series. In some embodiments, which will be discussed herein, each value in the forward information transfer rate time series is calculated with the vehicle data delayed with respect to the driver data by t–$\tau$ seconds. The time interval t–$\tau$ is chosen empirically to a maximize detection of flow of forward information. Further, the information transfer rate module 620 can calculate the plurality of reverse information transfer rates in the form of a reverse information transfer rate time series according to the following equation:

$$T_{VD} = \{T_{V_y \to D_{x1}}, T_{V_y \to D_{x2}} \ldots T_{V_y \to D_{xi}} \ldots T_{V_y \to D_{xN}}\} \quad (8)$$

where: $T_{VD}$ ($1 \leq i \leq N$) is a time series, which is an ordered collection of real values of reverse information transfer rate and each value in the time series is an estimation of reverse information transfer rate at a given time is equal to i/FS where FS is the sample rate and N is the number of elements in the time series. In some embodiments, which will be discussed herein, each value in the reverse information transfer rate time series is calculated with the driver data delayed with respect to the vehicle data by $\tau-t$ seconds. The time interval $\tau-t$ is chosen empirically to a maximize detection of flow of reverse information. Maximal points of forward information transfer and reverse information transfer will now be described in more detail with respect to FIGS. 8A and 8B.

Figure 8A:
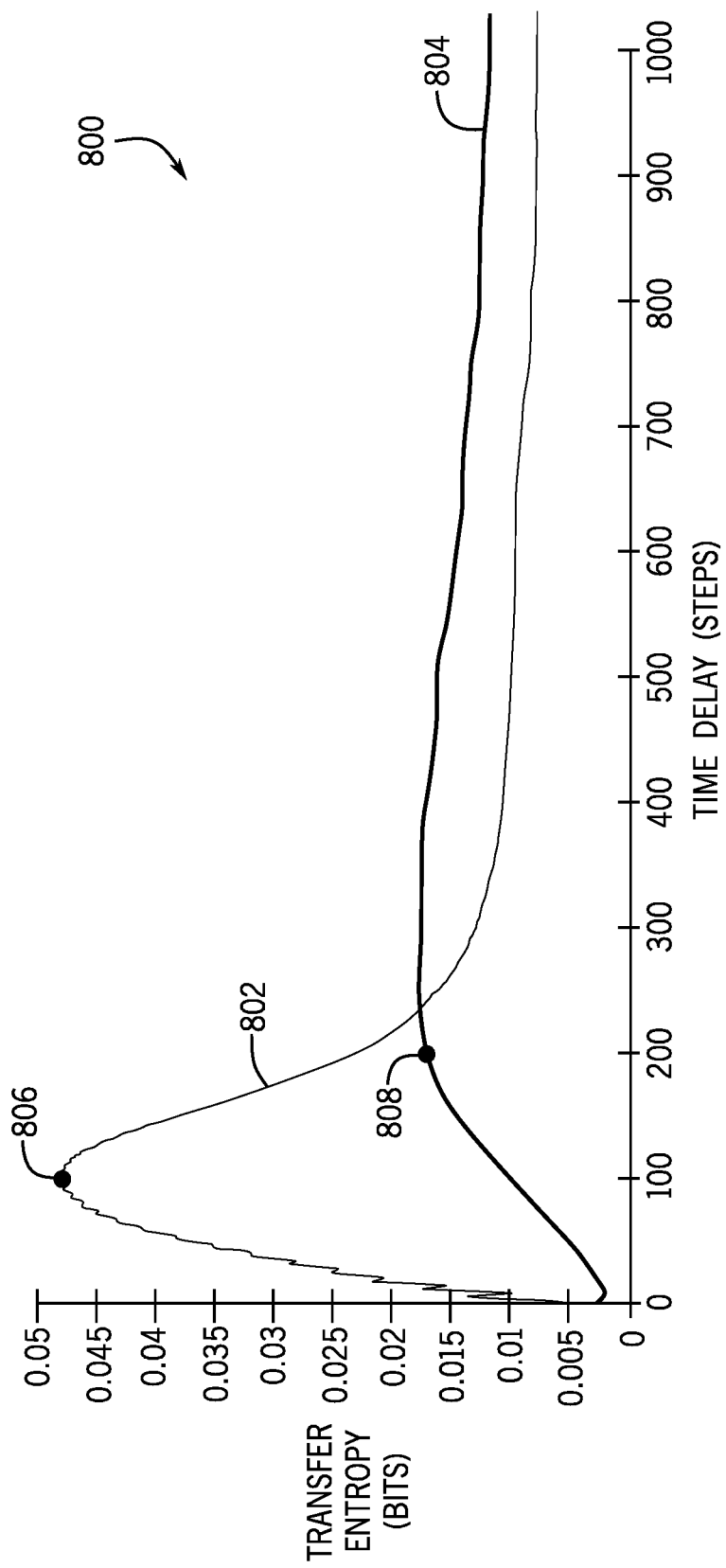
FIG. 8A is a transfer entropy graph based on information associated with a driver in vehicular control of a vehicle according to an exemplary embodiment.

Referring now to FIG. 8A a transfer entropy graph is shown illustrating exemplary forward information transfer rates and reverse information transfer rates. More specifically, FIG. 8A is a transfer entropy graph 800 based on data associated with a driver in vehicular control (e.g., alert) of a vehicle according to an exemplary embodiment. The transfer entropy graph 800 is based on steering wheel angle information (e.g., driver information) and lateral acceleration information (e.g., vehicle information) recorded simultaneously. Line 802 represents a plot of a plurality of forward information transfer rates (e.g., calculated according to equation (3)) and line 804 represents a plot of a plurality of reverse information transfer rates (e.g., calculated according to equation (6)). As can be seen in the transfer entropy graph 800, a peak 806 of forward information flow forms at 100 time steps, which corresponds to a time delay (i.e., $t-\tau$) of 0.5 second (5 ms/step). In this example, the forward information transfer rate is maximal at a first time delay of 100 time steps. Thus, it takes approximately 0.5 second for a vehicle to fully manifest a vehicle response maneuver from a driver maneuver (e.g., the driver transmits information by way of one or more driver control input devices).

As an illustrative example, and with reference again to FIGS. 1-2, the driver 545 may transmit information to the vehicle 500 by turning a steering wheel (not shown) thereby changing the steering wheel angle information (represented by the line 802). Transmitting the information can be a driver maneuver. In response to the driver maneuver, the vehicle 500 executes a vehicle response maneuver. Specifically, the lateral acceleration (e.g., represented by line 804) of the vehicle 500 changes in response to the driver maneuver. The time delay between the driver maneuver and the vehicle response maneuver is due in part to the linkage between the steering wheel and the tire-road interface. Thus, the time delay between the driver maneuver and the vehicle response maneuver is a time period for the driver maneuver (e.g., turning the steering wheel) to manifest in the vehicle response maneuver (e.g., the change in lateral acceleration). Accordingly, in one embodiment, the forward information transfer rate is maximal at a first time delay (i.e., $t-\tau$) corresponding to a time period between a driver maneuver and a vehicle response maneuver.

The transfer entropy graph 800 also illustrates a peak 808 of reverse information transfer rate that forms at 200 time steps, which corresponds to a time delay (i.e., $\tau-t$) of a 1 second delay (5 ms/step). In this example, the reverse information transfer rate is maximal at a second time delay of 200 time steps. Thus, it takes approximately 1 second for a driver to react with a driver response maneuver (e.g., the driver transmits information by way of one or more driver control input devices) in response to a vehicle maneuver. Referring again to the illustrative example discussed above, the vehicle 500 may perform a vehicle maneuver in response to an external condition. For example, an external condition could be a road condition, a weather condition, among others. In this illustrative example, the external condition can be an uneven road surface (e.g., bump) which causes the vehicle to laterally accelerate in a right direction (e.g., a vehicle maneuver). This information (i.e., vehicle maneuver) is transmitted to the driver 545 and manifests as a change in a parameter at the driver car interface (steering wheel angle).

In response to the vehicle maneuver caused by the external condition, the driver 545 can produce a driver response maneuver (e.g., by way of one or more driver control input devices). In some embodiments, the driver response maneuver is a reactive or a corrective action taken by the driver 545. Referring again to the illustrative example, based on the change in lateral acceleration of the vehicle 500 in the right direction, the driver 545 can turn the steering wheel (e.g., driver response maneuver) to the opposite direction (i.e., left) of the lateral acceleration to correct the direction of the vehicle 500. The time delay between the vehicle maneuver and the driver response maneuver is due in part to the driver 545 reaction time to the vehicle maneuver. Thus, the time delay between the vehicle maneuver and the driver response maneuver is a time period for the driver response maneuver (e.g., turning the steering wheel to the left) to fully manifest in response to the vehicle maneuver (e.g., lateral acceleration in right direction). Accordingly, in one embodiment, the reverse information transfer rate is maximal at a second time delay (i.e., $\tau-t$) corresponding to a time period between a vehicle maneuver and a driver response maneuver.

Figure 8B:
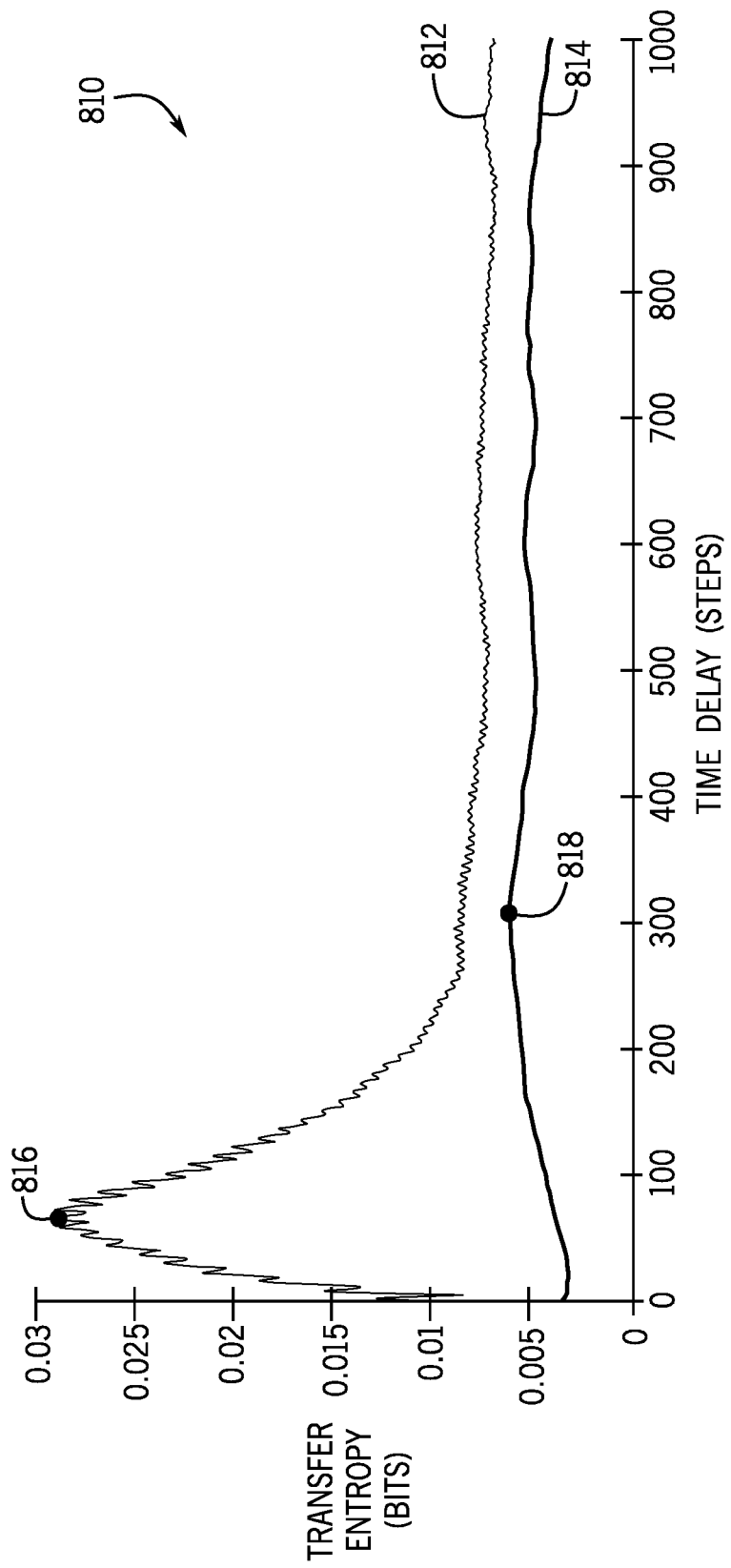
FIG. 8B is a transfer entropy graph based on information associated with a driver having decreased vehicular control of a vehicle as compared to FIG. 8A according to an exemplary embodiment.

Referring now to FIG. 8B, a transfer entropy graph 810 based on data associated with a driver with decreased vehicular control (e.g., distracted) is shown according to an exemplary embodiment. The transfer entropy graph 810 is based on steering wheel angle information (e.g., driver information) and lateral acceleration information (e.g., vehicle information) recorded simultaneously. Line 812 represents a plot of a plurality of forward information transfer rates (e.g., calculated according to equation (3)) and line 814 represents a plot of a plurality of reverse information transfer rates (e.g., calculated according to equation (6)). As can be seen in the transfer entropy graph 810, a peak 816 of forward information flow forms at 70 time steps, which corresponds to a time delay (i.e., $t-\tau$) of 0.35 second (5 ms/step). Thus, it takes approximately 0.35 second for a vehicle to fully manifest a vehicle response maneuver from a driver maneuver (e.g., the driver transmits information by way of one or more driver control input devices). This is similar to the peak 806 of FIG. 8A.

However, in contrast to FIG. 8A, in the transfer entropy graph 810 a peak 818 of reverse information transfer rate forms at 300 time steps, which correspond to a time delay (i.e., $\tau$) of a 1.5 second delay (5 ms/step). The second time delay (i.e., 300 time steps) of the reverse information transfer rate in FIG. 8B is significantly increased for a driver with decreased vehicular control as compared to the second time delay (i.e., 200 time steps) of the reverse information transfer rate shown in FIG. 8A. As will be discussed herein, a change in the maximal reverse information transfer rate can be attributed to a decrease in vehicular control.

Figure 9A:
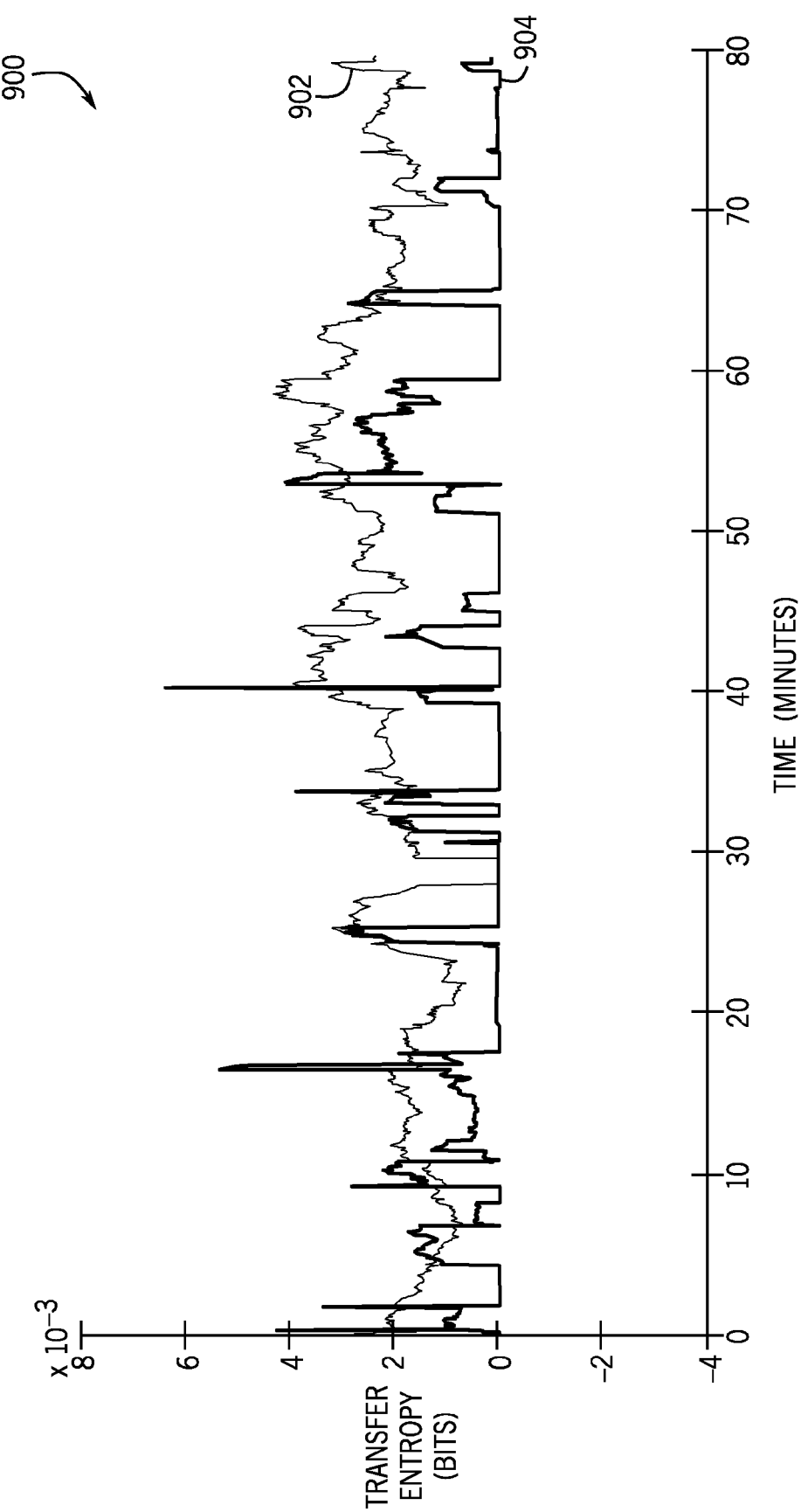
FIG. 9A is a transfer entropy graph based on information associated with a driver in vehicular control of a vehicle according to an exemplary embodiment.
Figure 9B:
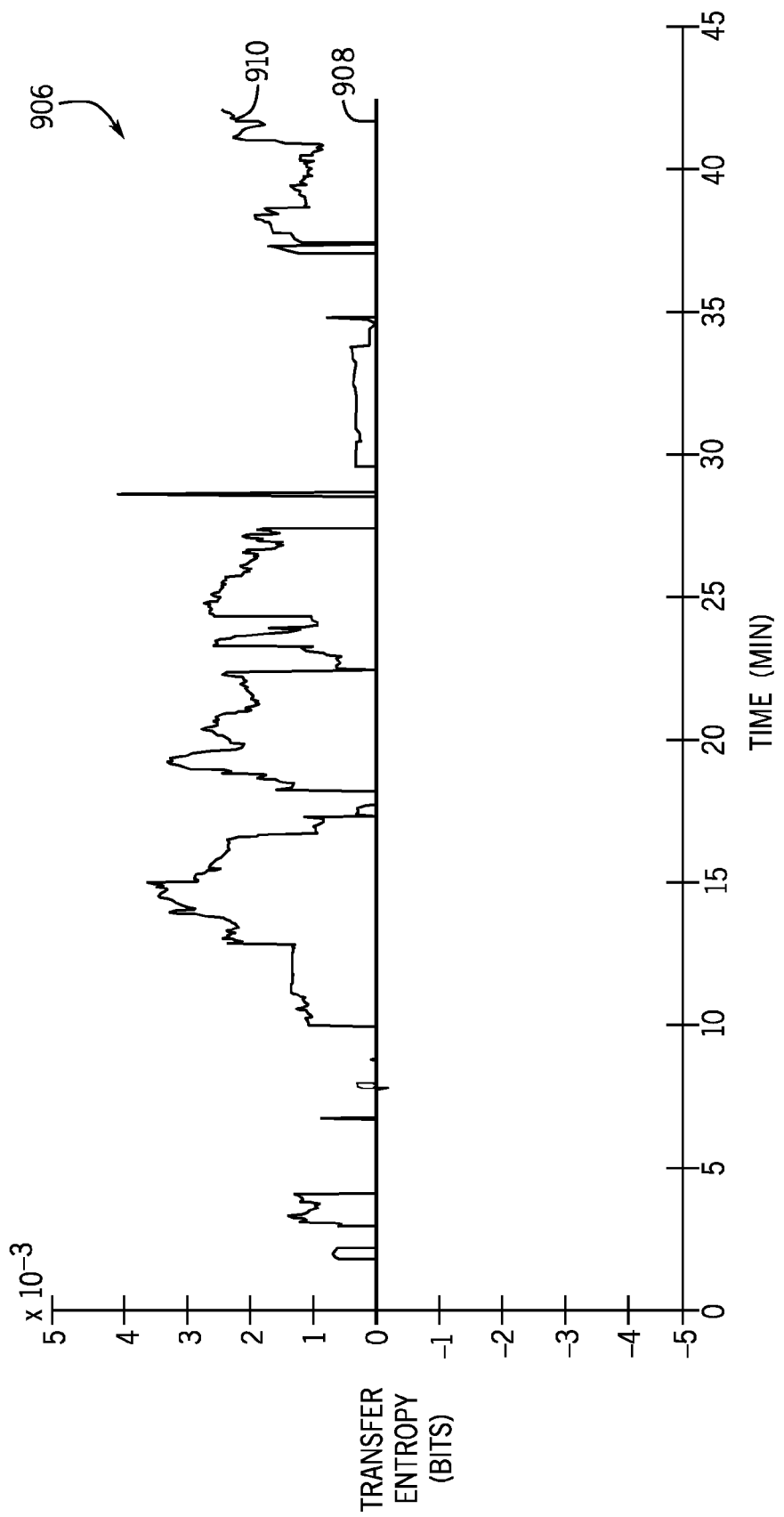
FIG. 9B is a transfer entropy graph based on information associated with a driver having decreased vehicular control of a vehicle as compared to FIG. 9A according to an exemplary embodiment.

FIGS. 8A and 8B illustrate a single maxima of forward information transfer rate and a single maxima of reverse information transfer rate over long data segments (e.g., N is approximately 1-2 million time points) using short segments (single points in this example) of driver data (k=1) and vehicle data (l=1) normalized on the interval [0,1]. As mentioned above, forward information transfer rate and reverse information transfer rate as computed by transfer and conditional entropies, can be calculated continuously over a period of time and/or a plurality of time segments. In some embodiments, a plurality of information transfer rates are calculated according to a first time delay and a plurality of reverse information transfer rates are calculated according to a second time delay. Referring now to FIGS. 9A and 9B, transfer entropy graphs with exemplary forward information transfer rates and reverse information transfer rates continuously calculated over a period of time are shown. The data shown in FIGS. 9A and 9B is based on steering wheel angle information (e.g., driver information) and lateral acceleration information (e.g., vehicle information) recorded simultaneously on a plurality of short data segments (e.g., 5 minute segments, N=60,000). FIG. 9A is a transfer entropy graph 900 based on driver information and vehicle information associated with a driver in vehicular control (e.g., alert) according to an exemplary embodiment. In this example, forward information transfer rates are calculated at 100 time step intervals (forward looking segments, driver to vehicle of 100 time steps, t−τ=0.5 seconds) and reverse information transfer rates are calculated at 200 time step intervals (reverse looking segments, vehicle to driver of 200 steps, τ−t=1 second). Thus, line 902 represents a plot of a plurality of forward information transfer rates (e.g., calculated according to equation (3) at a first time delay t of 100 time steps) and line 904 represents a plot of a plurality of reverse information transfer rates (e.g., calculated according to equation (6) at a second time delay τ of 200 time steps). Accordingly, in one embodiment, a plurality of forward information transfer rates are calculated at a first time delay where the forward information transfer rates are maximal, and a plurality of reverse information transfer rates are calculated at a second time delay where the reverse information transfer rates are maximal.

As shown in the transfer entropy graph 900, line 902 representing forward information transfer rates is generally greater than line 904 representing reverse information transfer rates. In contrast, FIG. 9B is a transfer entropy graph 906 based on driver information and vehicle information associated with a driver with decreased vehicular control (e.g., distracted) according to an exemplary embodiment. In this example, forward information transfer rates are calculated at 100 time step intervals (forward looking segments of 100 time steps) and reverse information transfer rates are calculated at 300 time step intervals (reverse looking segments of 300 steps). Thus, line 908 represents a plot of a plurality of forward information transfer rates (e.g., calculated according to equation (3) at a first time delay t−τ of 100 time steps) and line 910 represents a plot of a plurality of reverse information transfer rates (e.g., calculated according to equation (6) at a second time delay τ−t of 300 time steps). As shown in the transfer entropy graph 906, line 910 representing reverse information transfer rates is generally greater than line 908 representing forward information transfer rates. Thus, in one embodiment, an increase in reverse information transfer rate can be attributed to a decrease in vehicular control. Based on the above, forward information transfer rates and reverse information transfer rates can be used to determine vehicular control, which will now be discussed in more detail with reference to the examples above.

Referring again to FIG. 7A, the method 700 includes at block 710 calculating and/or determining a driver control state. The driver control state can be calculated by the driver safety factor module 625. The driver control state can be any numerical or other kind of value for distinguishing between two or more states of a driver. In the embodiments discussed herein, the driver control state can be a numerical or other kind of value for distinguishing between two or more states of vehicular control (i.e., a driver's control of a vehicle). For example, in some cases, the driver control state can be given as a percentage between 0% and 100%, where 0% refers to a driver that is totally in vehicular control (e.g., alert) and 100% refers to a driver that is not in vehicular control (e.g., fully distracted, drowsy or even asleep). In other cases, the driver control state could be a value in the range between 1 and 10. In still other cases, the driver safety factor is not a numerical value, but could be associated with a given discrete state, such as "no vehicular control," "slightly decreased vehicular control," "vehicular control," "slightly increased vehicular control" and "full vehicular control." Moreover, the driver control state could be a discrete value or a continuous value. It is understood that the driver control state can be any numerical or other kind of value for distinguishing between two or more states of a driver other than vehicular control, for example, vigilance, drowsiness, attentiveness, distraction, intoxication, among others.

In one embodiment, the driver control state is calculated using the forward information transfer rate from block 706 and the reverse information transfer rate from block 708. Thus, the driver control state, according to one embodiment, is calculated based on a transfer entropy of forward information flow from the driver 545 to the vehicle 500, and a transfer entropy of reverse information flow from the vehicle 500 to the driver 545. In some embodiments, the driver control state can be calculated based on a plurality of forward information transfer rates from block 706 and a plurality of reverse information transfer rates from block 708. It is understood that the driver control state can be calculated using the forward information transfer rate and the reverse information transfer rate separately or in combination to form various information sums and calculate the driver control state.

As mentioned above, the driver control state can be a value that indicates vehicular control and can be based on a comparison between the forward information transfer rate and the reverse information transfer rate. In one embodiment, the driver safety factor module 625 can compare the forward information transfer rate and the reverse information transfer rate to determine the driver control state. Thus, the driver control state can be calculated based on a relationship between the forward information transfer rate and the reverse information transfer rate at a single time segment and/or over a period of time.

Figure 7B:
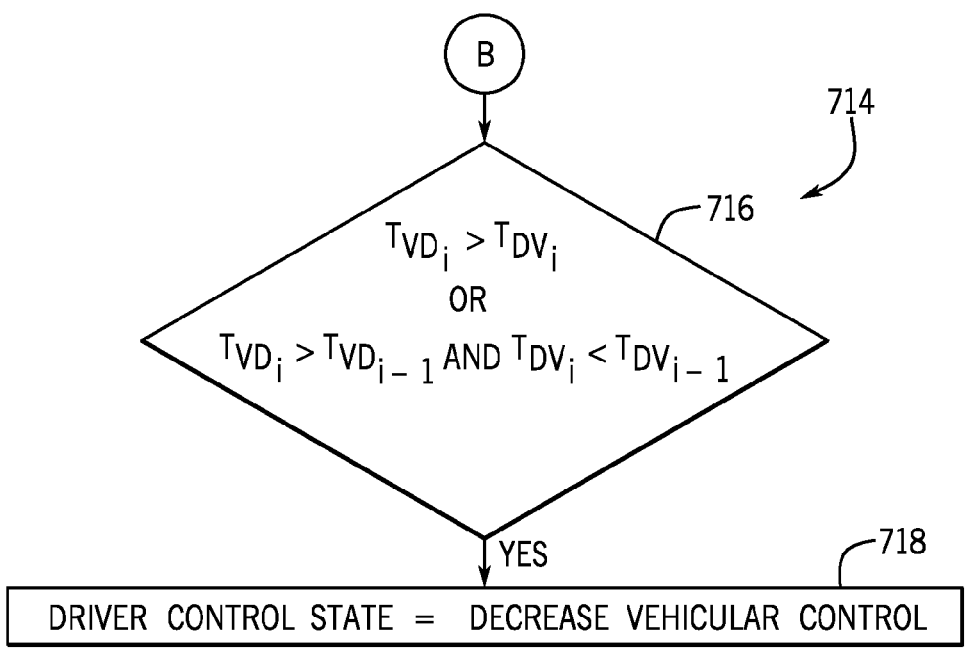
FIG. 7B is a process flow diagram of a method for determining a driver control state based on the forward information transfer rate and the reverse information transfer rate according to an exemplary embodiment.
Figure 7C:
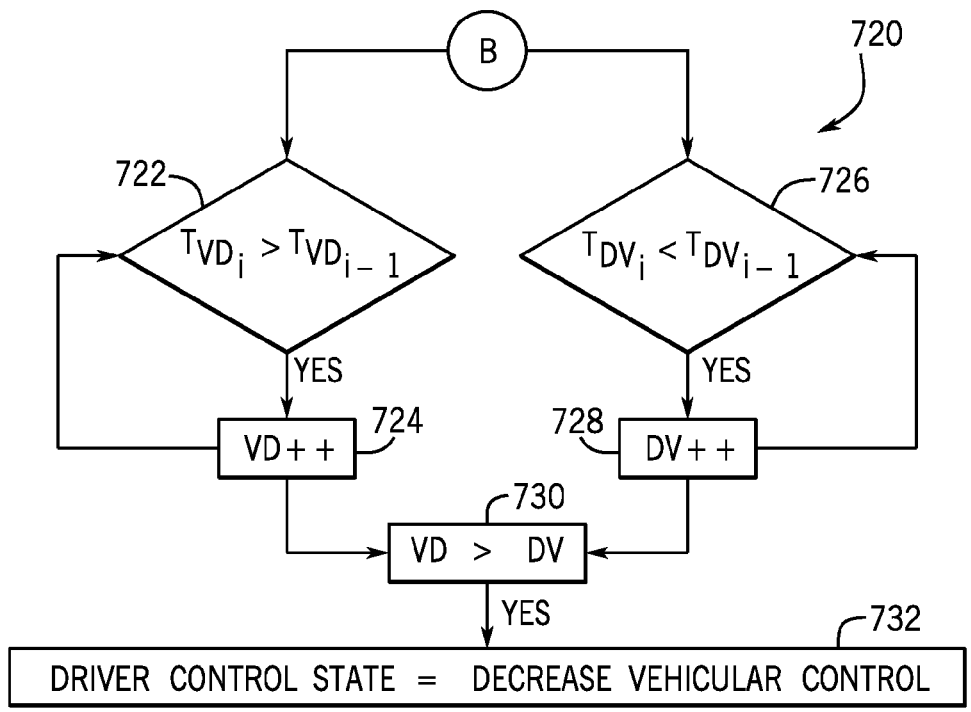
FIG. 7C is a process flow diagram of another method for determining a driver control state based on the forward information transfer rate and the reverse information transfer rate according to an exemplary embodiment.

Exemplary scenarios for determining a driver control state will now be discussed with reference to FIGS. 7B and 7C and the exemplary data shown in FIGS. 8A, 8B, 9A, 9B, 10A, and 10B. Referring now to FIG. 7B, a method 714 is shown for determining a driver control state according to an exemplary embodiment. At block 716, the method 714 includes comparing the forward information transfer rate and the reverse information transfer rate by determining whether the reverse information transfer rate is greater than the forward information transfer rate. For example, given a forward information transfer rate time series $(T_{DV})_{1 \ldots i}$ and a reverse information rate time series $(T_{VD})_{1 \ldots i}$, it is determined whether $(T_{VD})_i > (T_{DV})_i$. In some embodiments, it is determined whether the reverse information transfer rate at a second time delay (i.e., maximal reverse information transfer rate) is greater than the forward information transfer rate at a first time delay (i.e., maximal forward information transfer rate).

If the determination at block 716 is YES, the method 714 includes calculating the driver control state to indicate a decrease in vehicular control at block 718. This determination is supported by the data shown in FIG. 9A and FIG. 9B. In the transfer entropy graph 900 of FIG. 9A, which is based on driver information and vehicle information for a driver in vehicular control (e.g., alert), points where line 904 exceeds line 902 are points of decreased vehicular control (e.g., distraction). In the transfer entropy graph 906 of FIG. 9B, which is based on driver information and vehicle information for a driver with decreased vehicular control (e.g., distraction), line 910 (reverse information transfer rate) generally exceeds line 908 (forward information transfer rate) for the entire period of time. Accordingly, based on the above, upon determining the reverse information transfer rate is greater than the forward information transfer rate, the driver control state is calculated to indicate a decrease in vehicular control.

In an alternative embodiment, block 716 of method 714 can include determining if the forward information transfer rate decreases over the period of time and the reverse information transfer rate increases over the period of time. For example, given the forward information transfer rate time series and the reverse information transfer rate series above, it is determined whether:

$$((T_{VD})_i > (T_{VD})_{i-1}) \text{AND} ((T_{DV})_i < (T_{DV})_{i-1}) \quad (9)$$

If the determination at block 716 is YES, the method 714 includes calculating the driver control state to indicate a decrease in vehicular control at block 718. This determination is also supported by the data shown in FIG. 9A. In the transfer entropy graph 900 of FIG. 9A, which is based on driver information and vehicle information for a driver in vehicular control (e.g., alert), points where line 904 exceeds line 902 and line 902 decreases are points of decreased vehicular control (e.g., distraction). Accordingly, based on the above, upon determining the forward information transfer rate decreases over the period of time and the reverse information transfer rate increases over the period of time, the driver control state is calculated to indicate a decrease in vehicular control.

In one embodiment, the number of increases in reverse information transfer rate and/or the number of decreases in forward information transfer rate can be used to determine a driver control state. Referring now to FIG. 7C, a method 720 for determining a driver control state is shown. The method 720 loops through the forward information transfer rate time series and the reverse information transfer rate time series to determine points where the forward information transfer rate increases and the reverse information transfer rate decreases. Thus, a counter DV (forward information transfer rate decreases) and a counter VD (reverse information transfer rate increase) can be initialized at the beginning of the method 720. It is understood that blocks 722, 724 and blocks 726, 728 can be processed in parallel. At block 722, for each element i in the reverse information transfer rate series $(T_{VD})_{1 \ldots i}$, it is determined whether an increase occurs, specifically, whether, $((T_{VD})_i > (T_{VD})_{i-1})$. If the determination is YES, the counter VD is incremented at block 724.

In an alternative embodiment, block 722 can include determining whether an abrupt increase in the reverse information transfer rate occurs. An abrupt increase is an increase that meets a predetermined magnitude. Thus, in one embodiment, the difference between a reverse information transfer rate and a prior reverse information transfer rate can be determined at block 722 and compared to a predetermined threshold (not shown). If the difference is greater than the predetermine threshold, an abrupt increase in the reverse information transfer rate has occurred and the method 720 can proceed to block 724.

At block 726, for each element in the forward information transfer rate series $(T_{DV})_{1 \ldots i}$, it is determined whether a decrease occurs, specifically, whether $((T_{DV})_i < (T_{DV})_{i-1})$. If the determination at block 726 is YES, the counter DV is incremented at block 728. In an alternative embodiment, block 726 can include determining whether an abrupt decrease in the forward information transfer rate occurs. An abrupt decrease is a decrease that meets a predetermined magnitude. Thus, in one embodiment, the difference between a forward information transfer rate and a prior forward information transfer rate can be determined at block 722 and compared to a predetermined threshold (not shown). If the difference is greater than the predetermine threshold, an abrupt decrease in the forward information transfer rate has occurred and the method 720 can proceed to block 728.

Figure 10A:
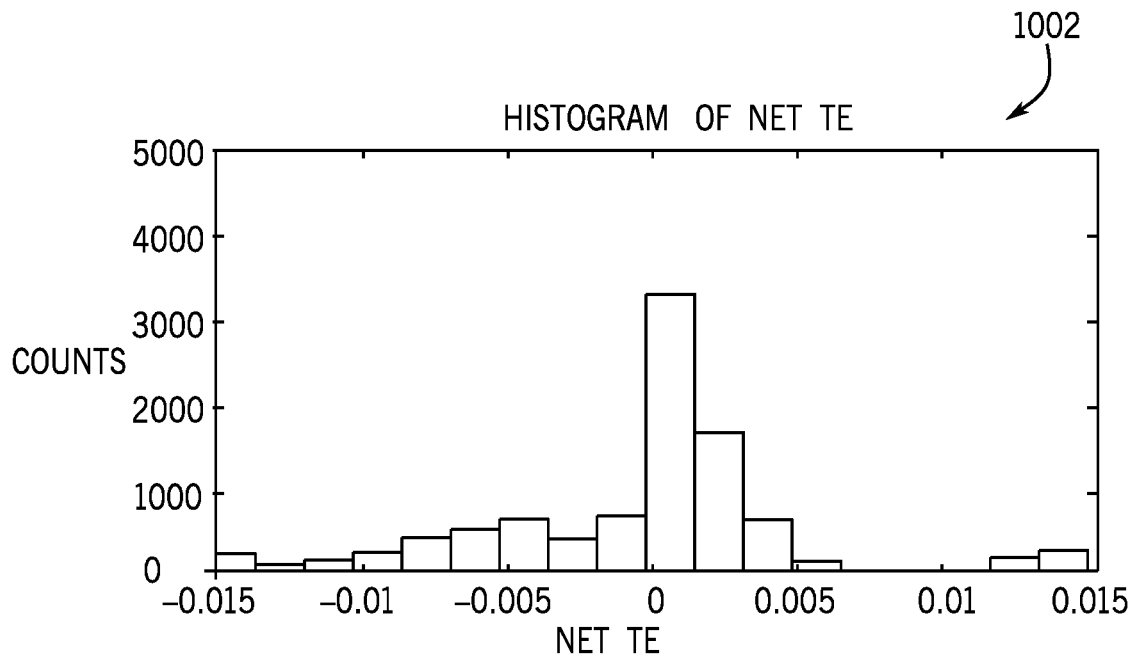
FIG. 10A is a histogram transfer entropy graph based on information associated with a driver in vehicular control of a vehicle according to an exemplary embodiment.
Figure 10B:
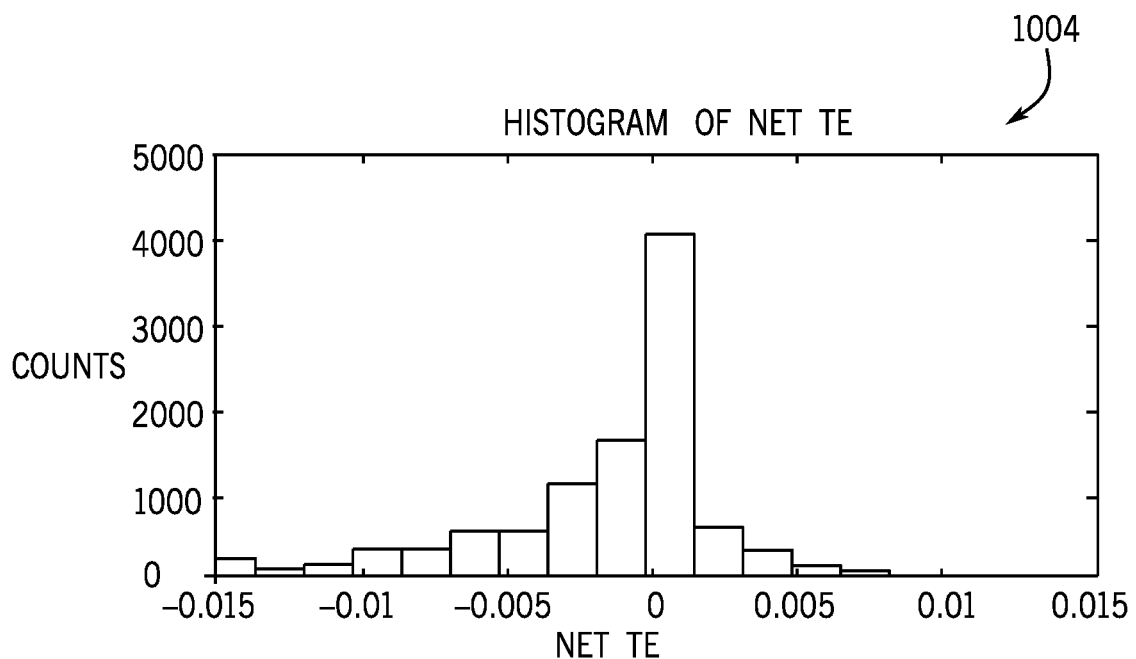
FIG. 10B is a histogram transfer entropy graph based on information associated with a driver having decreased vehicular control of a vehicle as compared to FIG. 10A according to an exemplary embodiment.

At block 730, it is determine whether the number of increases in the reverse information transfer rate is greater than the number of decreases in the forward information transfer rate (i.e., VD>DV). If the determination at block 730 is YES, at block 732 the driver control state is determined to indicate a decrease in vehicular control. Accordingly, in one embodiment, upon determining the number of increases in the reverse information transfer rate is greater than the number of decreases in the forward information transfer rate, the driver control state is calculated to indicate a decrease in driver control. In another embodiment, upon determining the number of abrupt increases in the reverse information transfer rate is greater than the number of abrupt decreases in the forward information transfer rate, the driver control state is calculated to indicate a decrease in driver control The distribution of the reverse information transfer rate increases and/or the forward information transfer rate decreases can also be used to determine a driver control state. Referring now to FIGS. 10A and 10B, transfer entropy histograms are shown. FIG. 10A is a transfer entropy histogram 1002 based on information associated with a driver in vehicular control (e.g., alert). In contrast, FIG. 10B is a transfer entropy histogram 1004 based on information associated with a driver with decreased vehicular control (e.g., distracted). As can be seen from the histogram 1002 and the histogram 1004, there is a shift in the left direction with a decrease in in positive entropy counts and an increase in greater negative transfer entropy counts with decreased vehicular control. Accordingly, in one embodiment, upon determining an increase in the distribution of negative information flow and a decrease in positive information flow, the driver control state is calculated to indicate a decrease in driver control.

It is understood that the exemplary determinations of driver control state discussed above are exemplary in nature, and other logic operations and/or logic gates can be implemented with the concepts discussed above. For example, in some embodiments, different logic gates (e.g., AND, OR) and truth tables, not discussed herein can be implemented. In some embodiments, in addition to the forward information transfer rate and/or the reverse information transfer rate, the driver control state can be based on types of monitoring information related to the driver 545 and/or the vehicle 500. For example, in some embodiments, measuring driver information at block 702 can include measuring physiological information about the driver 545. Physiological information can include biological information, for example, heart rate, blood pressure, oxygen content, blood alcohol content (BAC), respiratory rate, perspiration rate, skin conductance, brain wave activity, digestion information, salivation information, among others. In some embodiments, the driver control state can be based on the forward information transfer rate, the reverse information transfer rate, and physiological information. In other embodiments, the physiological information can be used to confirm and/or verify the driver control state level. Thus, data fusion can be used with transfer entropy to determine the driver control state.

It is appreciated that in some embodiments, the driver control state can be a driver safety factor as described in FIGS. 1-6. Thus, in some embodiments, determining a driver control state at block 710 can include retrieving a baseline forward information transfer rate and a baseline reverse information transfer rate as discussed with block 115 of FIG. 3. In some embodiments, determining a driver control state at block 710 can include normalizing the forward information transfer rate and the reverse information transfer rate as discussed at block 151 of FIG. 3. In other embodiments, the driver control state can be determined, based in part, on the driver safety factor. It is understood that the methods disclosed in FIGS. 7A, 7B, and 7C can incorporate one or more blocks of FIGS. 3-6.

Referring again to FIG. 7A, at block 712, the method 700 includes controlling a vehicle system based on the driver control state. In one embodiment, and as discussed above with FIGS. 3-6, the driver alert device 540 can be controlled based on the driver control state. For example, the driver alert device 540 is used to alert the driver 545 if a reduction in vehicle control occurs, based on the driver control state. In some embodiments, the driver control state can be compared to a driver safety alert threshold, as disclosed above at block 130 of FIGS. 3-6. If the driver control state does not exceed a predetermined driver safety alert threshold, the driver 545 can be alerted via the driver alert device 540, as discussed above at block 135 of FIGS. 3-6. The driver alert device 540 can be an output device of the vehicle 500 that outputs a visual, mechanical, or audio signal to alert the driver 545 to the reduction in vehicle control, which would allow the driver 545 to take action, such as pulling the vehicle 500 over, stopping the vehicle 500, or swerving the vehicle 500.

It is understood that the vehicle systems can be controlled as a function of the driver control state. Thus, as an illustrative example, the driver alert device 540 can output a visual signal based on a driver control state that indicates a small decrease in vehicular control, and the driver alert device 540 can output a visual signal and an audio signal based on a driver control state that indicates a medium decrease in vehicular control.

Further it is understood that other vehicle systems can be controlled, for example, Advanced Driving Assistance Systems (ADAS). For example, the driver alert module 615 can control a braking system (not shown) to automatically begin stopping and/or slowing down the vehicle 500 based on the driver control state. As an illustrative example, based on a decrease in vehicular control, the braking system can be controlled to prefill one or more brake lines with brake fluid to help increase the reaction time of the braking system as the driver depresses the brake pedal. By automatically controlling one or more vehicles systems of the vehicle 500, hazardous situations can be avoided that can be caused by a decrease in vehicular control.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A computer-implemented method for determining an information transfer rate in a vehicle, comprising:
   measuring driver information;
   measuring vehicle information;
   calculating a forward information transfer rate from a driver to the vehicle using the driver information and the vehicle information over a period of time;
   calculating a reverse information transfer rate from the vehicle to the driver using the driver information and the vehicle information over the period of time; and
   calculating a driver control state using the forward information transfer rate and the reverse information transfer rate.

2. The computer-implemented method of claim 1, wherein calculating the forward information transfer rate includes calculating the forward information transfer rate as a transfer entropy from a forward driver measurement x to a forward vehicle measurement y, conditioned on a prior forward driver measurement x and a prior forward vehicle measurement y.

3. The computer-implemented method of claim 2, wherein the forward information transfer rate is maximal at a first time delay corresponding to a time period between a driver maneuver and a vehicle response maneuver.

4. The computer-implemented method of claim 1, wherein calculating the reverse information transfer rate includes calculating the reverse information transfer rate as a transfer entropy from a reverse vehicle measurement y to a reverse driver measurement x, conditioned on a prior reverse driver measurement x and a prior reverse vehicle measurement y.

5. The computer-implemented method of claim 4, wherein the reverse information transfer rate is maximal at a second time delay corresponding to a time period between a vehicle maneuver and a driver response maneuver.

6. The computer-implemented method of claim 1, wherein the driver control state is a value based on a comparison between the forward information transfer rate and the reverse information transfer rate.

7. The computer-implemented method of claim 6, wherein upon determining the reverse information transfer rate is greater than the forward information transfer rate, the driver control state is calculated to indicate a decrease in vehicular control.

8. The computer-implemented method of claim 6, wherein upon determining the forward information transfer rate decreases over the period of time and the reverse information transfer rate increases over the period of time, the driver control state is calculated to indicate a decrease in vehicular control.

9. The computer-implemented method of claim 1, wherein the forward information transfer rate includes a time series of forward information transfer rates over the period of time, and the reverse information transfer rate includes a time series of reverse information transfer rates over the period of time.

10. The computer-implemented method of claim 9, wherein calculating the driver control state includes determining a number of decreases in the forward information transfer rate based on the time series of forward information transfer rates over the period of time and determining a number of increases in the reverse information transfer rate based on the time series of reverse information transfer rates over the period of time.

11. The computer-implemented method of claim 10, wherein upon determining the number of increases in the reverse information transfer rate is greater than the number of decreases in the forward information transfer rate, the driver control state is calculated to indicate a decrease in vehicular control.

12. A non-transitory computer readable medium comprising instructions that when executed by a processor perform a method for determining an information transfer rate, comprising:
measuring driver information from a driver;
measuring vehicle information from a vehicle;
calculating a forward information transfer rate from the driver to the vehicle using the driver information and the vehicle information over a period of time;
calculating a reverse information transfer rate from the vehicle to the driver using the driver information and the vehicle information over the period of time; and
calculating a driver control state using the forward information transfer rate and the reverse information transfer rate.

13. The non-transitory computer readable medium of claim 12, wherein calculating the forward information transfer rate includes calculating the forward information transfer rate as a transfer entropy from a forward driver measurement x to a forward vehicle measurement y over the period of time, and calculating the reverse information transfer rate includes calculating the reverse information transfer rate as a transfer entropy from a reverse vehicle measurement y to a reverse driver response measurement x over the period of time.

14. The non-transitory computer readable medium of claim 13, wherein the forward information transfer rate is maximal at a first time delay corresponding to a time period between a driver maneuver and a vehicle response maneuver, and the reverse information transfer rate is maximal at a second time delay corresponding to a time period between a vehicle maneuver and a driver response maneuver.

15. The non-transitory computer readable medium of claim 12, wherein the driver control state is a value based on a comparison between the forward information transfer rate and the reverse information transfer rate.

16. An information transfer rate system for determining an information transfer rate, the information transfer rate system comprising:
a computer processor; and
a computer readable storage medium storing executable code when executed by the computer processor performs a method, comprising:
measuring driver information from a driver information sensing device;
measuring vehicle information from a vehicle information sensing device;
calculating a forward information transfer rate from the driver to the vehicle using the driver information and the vehicle information over a period of time;
calculating a reverse information transfer rate from the vehicle to the driver using the driver information and the vehicle information over the period of time;
calculating a driver control state using the forward information transfer rate and the reverse information transfer rate; and
controlling a vehicle system based on the driver control state.

17. The information transfer rate system of claim 16, wherein the forward information transfer rate is calculated as a transfer entropy of information flow from the driver information sensing device to the vehicle information sensing device over the period of time, and the reverse information transfer rate is calculated as a transfer entropy of information flow from the vehicle information sensing device to the driver information sensing device.

18. The information transfer rate system of claim 17, wherein the forward information transfer rate is maximal at a first time delay corresponding to a time period for a driver maneuver received at the driver information sensing device to manifest into a vehicle maneuver sensed by the vehicle information sensing device.

19. The information transfer rate system of claim 16, wherein the reverse information transfer rate is maximal at a second time delay corresponding to a time period from a vehicle maneuver sensed by the vehicle information sensing device to a driver response maneuver received at the driver information sensing device in response to the vehicle maneuver.

20. The information transfer rate system of claim 19, wherein the driver control state is calculated to indicate a decrease in vehicular control upon determining the second time delay increases over the period of time.

* * * * *